(12) United States Patent
Watanabe et al.

(10) Patent No.: US 11,972,619 B2
(45) Date of Patent: Apr. 30, 2024

(54) INFORMATION PROCESSING DEVICE, INFORMATION PROCESSING SYSTEM, INFORMATION PROCESSING METHOD AND COMPUTER-READABLE RECORDING MEDIUM

(71) Applicant: EVIDENT CORPORATION, Nagano (JP)

(72) Inventors: Nobuyuki Watanabe, Yokohama (JP); Hidetoshi Nishimura, Koganei (JP); Kazuhito Horiuchi, Hachioji (JP)

(73) Assignee: Evident Corporation, Nagano (JP)

( * ) Notice: Subject to any disclaimer, the term of this patent is extended or adjusted under 35 U.S.C. 154(b) by 255 days.

(21) Appl. No.: 17/395,666

(22) Filed: Aug. 6, 2021

(65) Prior Publication Data
US 2021/0364776 A1 Nov. 25, 2021

Related U.S. Application Data

(63) Continuation of application No. PCT/JP2019/006369, filed on Feb. 20, 2019.

(51) Int. Cl.
*G06V 20/69* (2022.01)
*G02B 21/36* (2006.01)
(Continued)

(52) U.S. Cl.
CPC .......... *G06V 20/69* (2022.01); *G02B 21/367* (2013.01); *G02B 21/368* (2013.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 7,593,602 B2 | 9/2009 | Stentiford | |
| 2008/0187241 A1* | 8/2008 | Talati | G06V 10/25 382/282 |

(Continued)

FOREIGN PATENT DOCUMENTS

| | | | |
|---|---|---|---|
| JP | 2005-202173 A | 7/2005 | |
| JP | 2011-215660 A | 10/2011 | |

(Continued)

OTHER PUBLICATIONS

International Search Report dated May 7, 2019 received in PCT/JP2019/006369.

*Primary Examiner* — Stefan Gadomski
(74) *Attorney, Agent, or Firm* — Scully, Scott, Murphy & Presser, P.C.

(57) ABSTRACT

An information processing device includes: a storage configured to store display region information and a count value, the display region information indicating a position of a predetermined display region in a first image corresponding to image data, the count value indicating frequency of display of each predetermined region in the first image; and a processor including hardware. The processor is configured to, based on the image data and an instruction signal for selecting the display region, generate a display image corresponding to the display region that is selected by the instruction signal, determine whether the display region information meets a first condition, add a predetermined value to the count value of the region on which it is determined that the first condition is met, and set, for a region of interest, a region that draws an interest in the first image based on the count value.

7 Claims, 23 Drawing Sheets

(51) Int. Cl.
G06T 7/73 (2017.01)
G06V 10/25 (2022.01)

(52) U.S. Cl.
CPC .... G06V 10/25 (2022.01); *G06T 2207/10056* (2013.01); *G06T 2207/20221* (2013.01); *G06T 2207/30242* (2013.01)

(56) References Cited

U.S. PATENT DOCUMENTS

| | | | |
|---|---|---|---|
| 2011/0298702 A1 | 12/2011 | Sakata et al. | |
| 2013/0187954 A1* | 7/2013 | Saito | G06T 11/60 345/634 |
| 2015/0213631 A1* | 7/2015 | Vander Broek | G06Q 30/02 345/589 |
| 2016/0217263 A1 | 7/2016 | Sawada et al. | |
| 2016/0292828 A1* | 10/2016 | Yokouchi | G06T 5/002 |
| 2017/0059844 A1 | 3/2017 | Sato et al. | |
| 2018/0011588 A1* | 1/2018 | Lu | G06F 3/041661 |
| 2018/0137119 A1 | 5/2018 | Li et al. | |
| 2018/0302601 A1* | 10/2018 | Chen | H04N 21/23412 |
| 2018/0302602 A1* | 10/2018 | Chen | H04N 21/44008 |

FOREIGN PATENT DOCUMENTS

| | | |
|---|---|---|
| JP | 2015-504529 A | 2/2015 |
| JP | 2015-114798 A | 6/2015 |
| JP | 2016-139397 A | 8/2016 |
| JP | 2017-046340 A | 3/2017 |
| WO | 2011/074198 A1 | 6/2011 |
| WO | 2013/064697 A1 | 5/2013 |

* cited by examiner

INFORMATION PROCESSING DEVICE, INFORMATION PROCESSING SYSTEM, INFORMATION PROCESSING METHOD AND COMPUTER-READABLE RECORDING MEDIUM

CROSS-REFERENCE TO RELATED APPLICATION

This application is a continuation of International Application No. PCT/JP2019/006369, filed on Feb. 20, 2019, the entire contents of which are incorporated herein by reference.

BACKGROUND

1. Technical Field

The disclosure relates to an information processing device, an information processing system, an information processing method, and a computer-readable recording medium.

2. Related Art

A technique of enlarging part of a specimen image that is digitized by virtual slide and thus displaying the specimen image is known (For example, Japanese National Publication of International Patent Application No. 2015-504529). According to the technique, a digital specimen image larger than a field of view of a microscope can be displayed by combining and stitching multiple images and the user moves a positon of display of the specimen image to up, down, right and left and changes a display magnification by operating a zoom, thereby performing observation while searching the specimen image for a region of interest that is important in diagnosis.

SUMMARY

In some embodiments, an information processing device includes: a storage configured to store display region information and a count value, the display region information indicating a position of a predetermined display region in the first image corresponding to the image data that is input from an external device, the count value indicating frequency of display of each predetermined region in the first image; and a processor including hardware, the processor being configured to, based on the image data and an instruction signal that is input from an external device to select the display region, generate a display image corresponding to the display region that is selected by the instruction signal, using the first image, determine whether the display region information meets a first condition, add a predetermined value to the count value of the region on which it is determined that the first condition is met, and set, for a region of interest, a region that draws an interest in the first image, based on the count value.

In some embodiments, an information processing system includes an observation device configured to observe a subject, a storage configured to store a position in which the subject is selected by the observation device, a field-of-view information indicating at least a size of a field of view of the observation device, and a count value indicating frequency of display of each predetermined region; and a processor comprising hardware, the processor being configured to determine whether the field-of-view information meets a predetermined condition, add a predetermined value to the count value of the region on which it is determined that the predetermined condition is met, and set, for a region of interest, a region that draws an interest in a coordinate system corresponding to the subject based on the count value.

In some embodiments, provided is an information processing method that is executed by an information processing device. The method includes: based on the image data that is input from an external device and an instruction signal that is input from an external device to select a predetermined display region in an image corresponding to the image data, generating a display image corresponding to the display region that is selected by the instruction signal, using a first image corresponding to the image data; acquiring display region information from a storage configured to store the display region information indicating a position of the display region in the first image and a count value indicating frequency of display of each predetermined region in the first image; determining whether the display region information meets a predetermined condition; incrementally increasing the count value of the region on which it is determined that the predetermined condition is met; and setting, for a region of interest, a region that draws an interest in the first image based on the count value.

In some embodiments, provided is a non-transitory computer-readable recording medium with an executable program stored thereon. The program causes an information processing device to: based on the image data that is input from an external device and an instruction signal that is input from an external device to select a predetermined display region in an image corresponding to the image data, generate a display image corresponding to the display region that is selected by the instruction signal, using a first image corresponding to the image data; acquire display region information from a storage configured to store the display region information indicating a position of the display region in the first image and a count value indicating frequency of display of each predetermined region in the first image; determine whether the display region information meets a predetermined condition; incrementally increase the count value of the region on which it is determined that the predetermined condition is met; and set, for a region of interest, a region that draws an interest in the first image based on the count value.

The above and other features, advantages and technical and industrial significance of this disclosure will be better understood by reading the following detailed description of presently preferred embodiments of the disclosure, when considered in connection with the accompanying drawings.

DETAILED DESCRIPTION

Modes for carrying out the disclosure will be described in detail below with reference to the accompanying drawings. The following embodiments do not limit the disclosure. In the following description, each drawing to be referred to only schematically illustrates shapes, sizes, and positional relationships such that the content of the disclosure is understandable. In other words, the disclosure is not limited to the shapes, sizes, and positional relationships that are exemplified in each drawing.

First Embodiment

Configuration of Information Processing System

Figure 1:
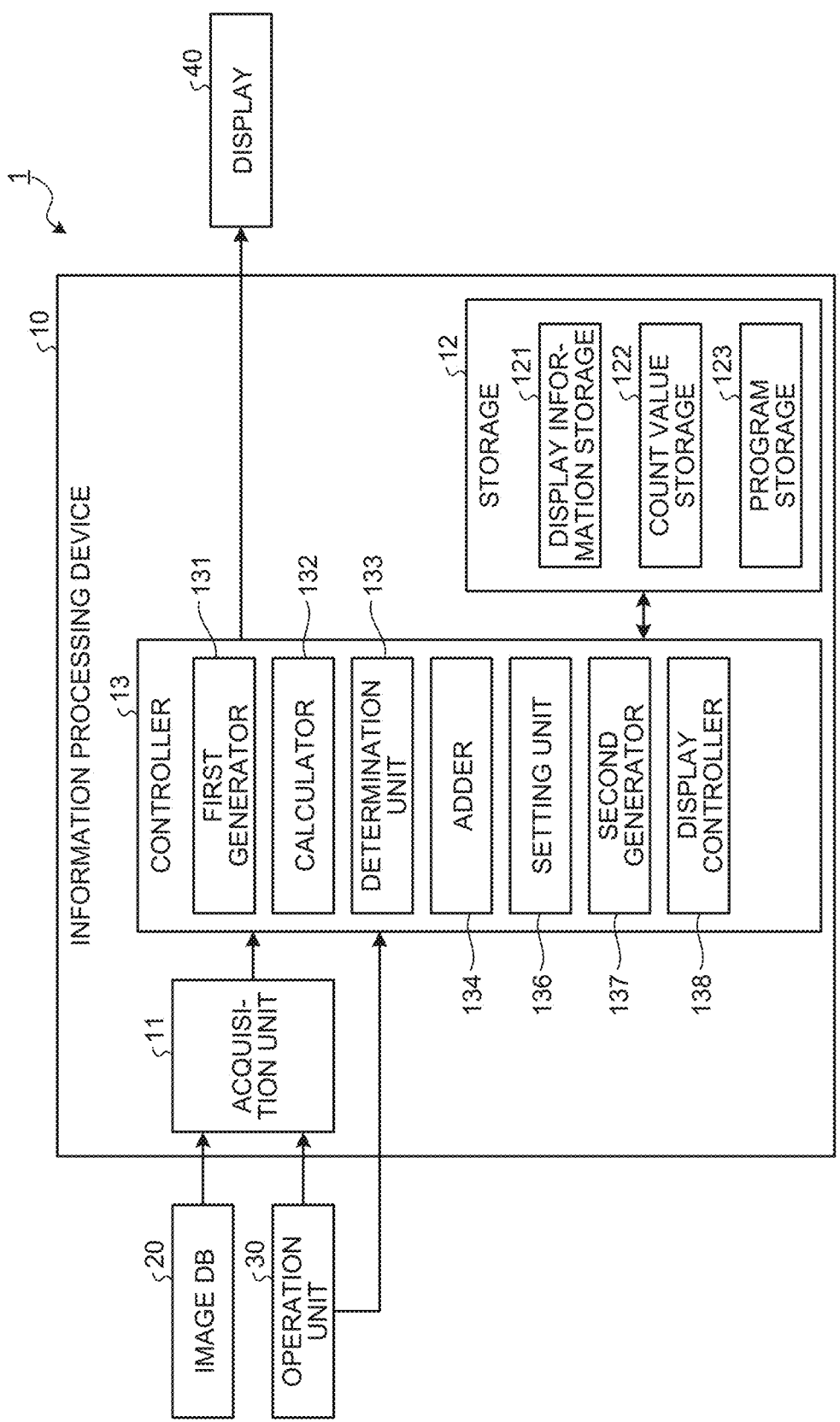
FIG. 1 is a block diagram illustrating a functional configuration of an information processing system according to a first embodiment.

FIG. 1 is a block diagram illustrating a functional configuration of an information processing system according to a first embodiment. The information processing system 1 illustrated in FIG. 1 includes an information processing device 10, an image database 20 ("image DB 20" below), an operation unit 30, and a display unit 40.

The information processing device 10 acquires desired image data from multiple sets of image data that are recorded in the image DB 20 according to an operation of the user on the operation unit 30 and outputs, to the display unit 40, a display image that is based on the image data and that corresponds to a display region (observation field of view) corresponding to an instruction signal corresponding to an instruction on the operation unit 30. The image data is two-dimensional plane data obtained by capturing an image of a specimen or a sample by a microscope, or the like. The detailed configuration of the information processing device 10 will be described below.

The image DB 20 stores the sets of two-dimensional image data generated by capturing images of a specimen or a sample by a microscope, or the like. The image DB 20 consists of a server system connected via a network or a local hard disk drive (HDD) and a solid state drive (SSD), or the like.

The operation unit 30 receives an operation of the user and outputs an instruction signal corresponding to the received operation to the information processing device 10. The operation unit 30 consists of a keyboard, a mouse, a touch panel, etc.

Under the control of the information processing device 10, the display unit 40 displays the image corresponding to the image data that is input from the information processing device 10. The display unit 40 consists of a liquid crystal or organic electro luminescence (EL) display panel, or the like.

Configuration of Information Processing Device

The detailed configuration of the information processing device 10 will be described. The information processing device 10 includes an acquisition unit 11, a storage 12 and a controller 13.

Under the control of the controller 13, according to an instruction signal that is input from the operation unit 30, the acquisition unit 11 acquires image data that is selected according to an instruction signal that is input from the operation unit 30 from multiple sets of two-dimensional planes that are stored in the image DB 20. The acquisition unit 11 consists of, for example, a predetermined I/F circuit.

The acquisition unit 11 acquires image data from the image DB 20 in a wired or wireless manner.

The storage 12 includes a display information storage 121 that stores display region information indicating the position of a predetermined display region in the image that is displayed on the display unit 40 and that is in a first image (subject image) corresponding to the image data that is acquired by the acquisition unit 11; a count value storage 122 that stores a count value ("count value" below) indicating frequency of display of each predetermined region in the display region in the subject image that is displayed on the display unit 40; and a program storage 123 that stores various programs to be executed by the information processing system 1. The storage 12 consists of a volatile memory, a non-volatile memory, a HDD, a SSD, a memory card, etc.

The controller 13 controls each of the units of which the information processing system 1 consists. The controller 13 consists of hardware including a memory and processors, such as a central processing unit (CPU), a field programmable gate array (FPGA) and an application specific integrated circuit (ASIC). The controller 13 includes a first generator 131, a calculator 132, a first determination unit 133, an adder 134, a setting unit 136, a second generator 137, and a display controller 138.

Based on the image data that is acquired by the acquisition unit 11 and an instruction signal that is input from the operation unit 30 and by which the predetermined display region in the subject image is selected, the first generator 131 generates the display image corresponding to the display region that is selected by the instruction signal, using the subject image. Specifically, using the subject image, the first generator 131 generates a trimming image by performing a trimming process of cutting out the display region that is selected by the instruction signal and generates the display image by performing a resizing process of performing a process of enlarging or reducing the trimming image to the display region of the display unit 40 or of performing an interpolation process.

The calculator 132 calculates display region information indicating the position and size of the display image in the subject image that is acquired by the acquisition unit 11 and stores the result of the calculation in the display information storage 121. Specifically, when a predetermined position in the subject image is set for an origin, for example, when the pixel of the top left end of the subject image is set for an origin (0,0), a pixel address indicating the position of the display region in the subject image is calculated as the display region information. The pixel address of the bottom right end of the display region in the subject image or of each of the apexes of a rectangle serves as the pixel address indicating the position of the display region in the subject image.

Based on the display region information that is stored in the display information storage 121, the first determination unit 133 determines whether a predetermined condition is met on each predetermined region in the subject image. The predetermined condition is a display time during which the subject image is displayed on the display unit 40. The determination unit 133 determines the conditions meet determination condition as described below.

The adder 134 incrementally increases the count value of the region on which the first determination unit 133 determines that the predetermined condition is met. Specifically, the adder 134 incrementally increases the count value of the region on which the first determination unit 133 determines that the predetermined condition is met, for example, by "1", thereby making an addition to the count value.

The determination condition determines whether the display time is longer than a predetermined time on each predetermined region in the subject image.

Based on the count value that is stored in the count value storage 122, the setting unit 136 sets, for a region of interest, a region that draws an interest in the target image corresponding to the image data that is acquired by the acquisition unit 11. Specifically, the setting unit 136 sets, for the region of interest that draws more interest, a region having larger count value that is stored in the count value storage 122. Furthermore, the setting unit 136 sets, for a region of interest, a region of which count value stored in the count value storage 122 is larger than a predetermined value.

The second generator 137 generates a superimposed image in which region-of-interest information on the region of interest that is set by the setting unit 136 is superimposed onto the subject image corresponding to the image data that is acquired by the acquisition unit 11. In this case, based on the count value of the region of interest that is set by the setting unit 136, the second generator 137 generates a superimposed image in which a frame corresponding to the region of interest is superimposed as region-of-interest information such that the region of interest is identifiable. Note that, based on the count value of the region of interest that is set by the setting unit 136, the second generator 137 may generate a superimposed image in which, based on the count value of the region of interest that is set by the setting unit 136, the chrome, tone and contrast of the region of interest are enhanced and thus they are superimposed as region-of-interest information such that the region of interest is identifiable.

The display controller 138 causes the display unit 40 to display the display image that is generated by the first generator 131 and the superimposed image that is generated by the second generator 137. The display controller 138 causes the display unit 40 to display various types of information on the information processing system 1.

Process of Information Processing Device

Figure 2:
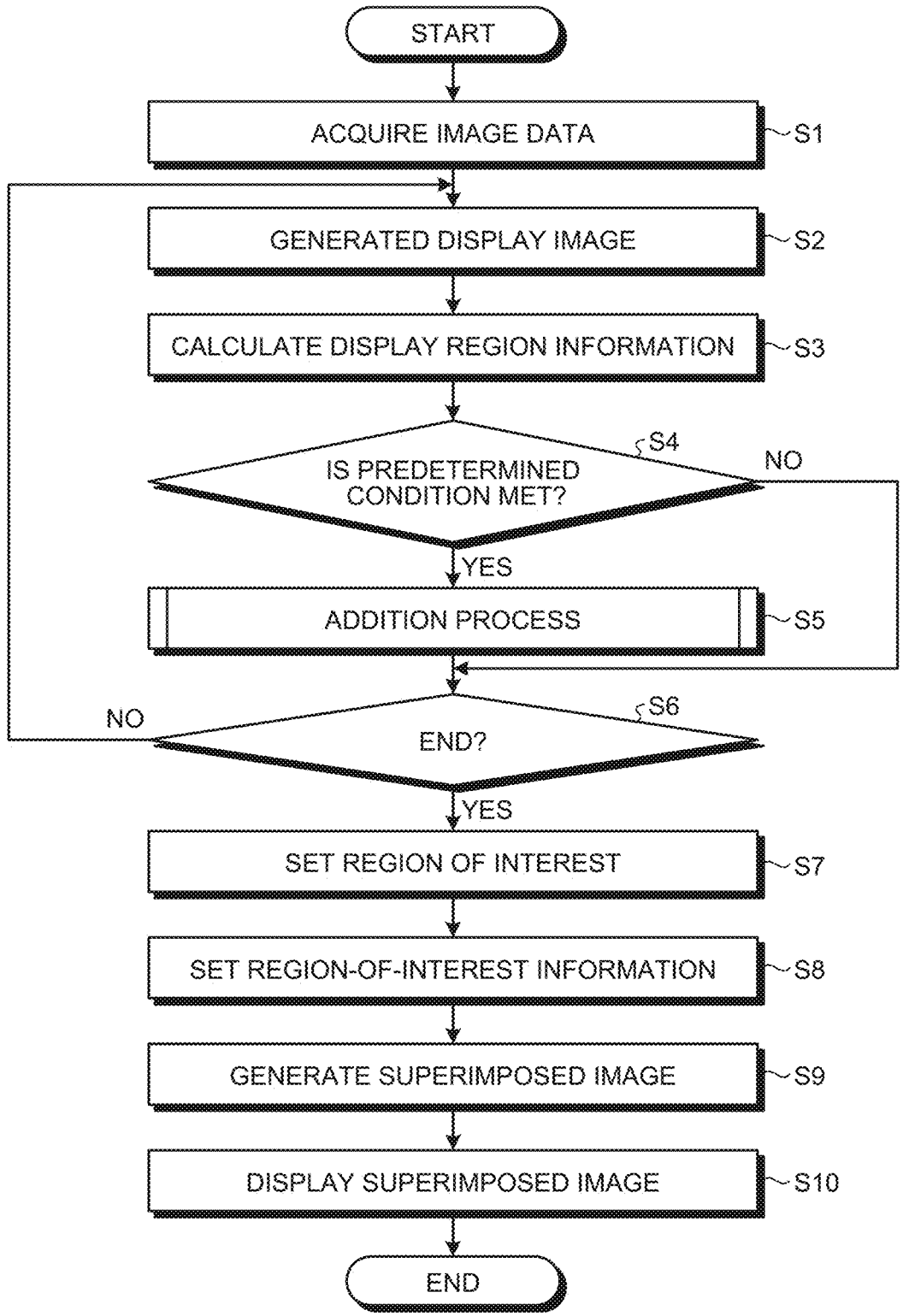
FIG. 2 is a flowchart illustrating an overview of a process that is executed by an information processing device.

A process that is executed by the information processing device 10 will be described next. FIG. 2 is a flowchart illustrating an overview of the process that is executed by the information processing device 10.

As illustrated in FIG. 2, first of all, the acquisition unit 11 acquires image data corresponding to an instruction signal that is input from the operation unit 30 from the image DB 20 (step S1).

Subsequently, for a subject image corresponding to the image data that is acquired by the acquisition unit 11, based on an instruction signal that specifies a display region in the subject image that is input from the operation unit 30, the first generator 131 generates a display image corresponding to the display region that is selected by the instruction signal (step S2).

The calculator 132 then calculates display region information containing relative coordinates (world coordinates) based on a predetermined position in a display range (whole display region) in the coordinates of the subject image and the size of the display region (step S3). Specifically, the calculator 132 calculates display region information containing relative coordinates $(x_k, y_k)$ of a display image where the top left end of the display range in the coordinate system based on the subject image (the first image) serves as a reference (0,0) and a size $(w_k, h_k)$ of a display range of the display image. In this case, the calculator 132 stores the display region information in the display information storage 121.

Based on the display region information that is stored in the display information storage 121, the determination unit 133 determines whether the predetermined condition is met on each predetermined region in the subject image (step S4). The predetermined condition is based on the display time during which the display unit 40 makes a display. The method that is taken by the first determination unit 133 to determine whether the predetermined condition is met includes, for example, acquiring, at each predetermined time interval $\Delta t$, display information such as a start point (xt,yt) of display of the display information on the display image at a time t that is generated at step S2 described above and a size (wt and ht) of the display image at the time t on the image data that is selected at step S1 described above (refer to step S3 described above), and determining that "the predetermined condition is met" when, on whether the size has not varied for a predetermined time, that is, the magnification has been constant for the predetermined time and the start point (xt,yt) has been within a predetermined range for the predetermined time, the following condition is met:

$$xt-\Delta < xk < xt+\Delta \text{ and } yt-\Delta < yk < yt+\Delta$$

(k=t, t+$\Delta$t, . . . n$\Delta$t, $\Delta$t: step width).

Note that, when it is assumable that the aspect ratio of the display region is constant, any one of wt and ht may be stored. When the first determination unit 133 determines that the predetermined condition is met (YES at step S4), the information processing device 10 moves to step S5. On the other hand, when the first determination unit 133 determines that the predetermined condition is not met (NO at step S4), the information processing device 10 moves to step S6 described below.

At step S5, the adder executes an addition process of making an addition to the count value of frequency of display of each predetermined region in the subject image that is displayed on the display unit 40. FIG. 2 illustrates the example in which generation of the display information at predetermined time intervals, determination on the predetermined condition, and the addition process are carried out in the order. Alternatively, display information (xk,yk and wk and hk) may be generated at predetermined time intervals, the generated display information may be temporarily stored in the storage 12, the stored display information may be then read again, and the read display information may be evaluated. In that case, the display information before and after the time t may be used for determination on the above-described condition of not having varied for the predetermined time.

Overview of Addition Process

Figure 3:
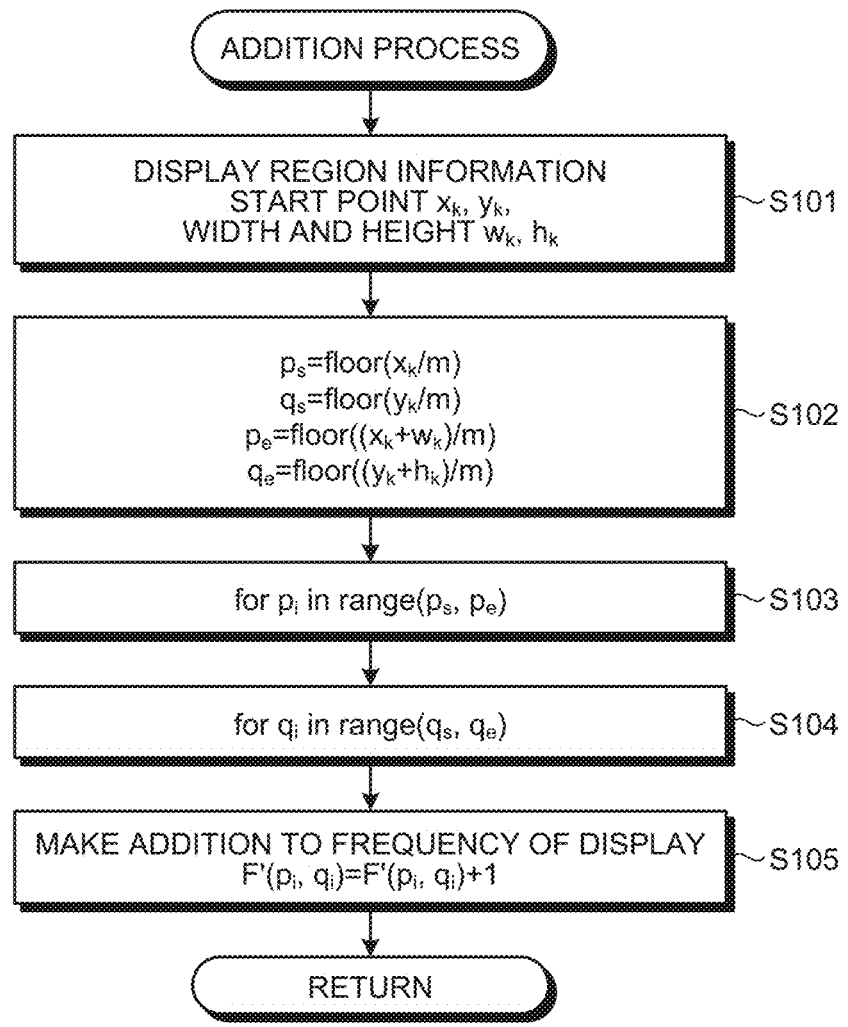
FIG. 3 is a flowchart illustrating an overview of an addition process in FIG. 2.

FIG. 3 is a flowchart illustrating an overview of the addition process at step S5 in FIG. 2 described above.

The adder 134 sets a start point (xk,yk), a width (wk) and a height (hk) of the display region information (step S101). The width and height of the subject image that is acquired from the image DB 20 is referred to as W and H below, respectively. The subject image is divided by a region of m×m pixels, and p×q addition registers are prepared. The relationship between W, H, m, p and q are expressed by Equations (1) and (2) below.

$$W = m \times p \quad (1)$$

$$H = m \times q \quad (2)$$

The adder 134 then calculates addresses of the addition registers corresponding to the display image (step S102).

$$ps = \text{floor}(xk/m)$$

$$qs = \text{floor}(yk/m)$$

$$pe = \text{floor}((xk+wk)/m)$$

$$qe = \text{floor}((yk+hk)/m)$$

where $0 < pi \leq p$ and $0 < qs \leq q$ are satisfied.

The adder 134 then sets an address (for pi in range (ps,pe)) of each region in the display image in the vertical direction (step S103) and sets an address (for qi in range (qs,qe)) of each region in the display image in the horizontal direction (step S104).

The adder 134 incrementally increases the counts of frequency of registers F(pi,qi) that are specified at steps S103 and S104 sequentially (step S105).

$$(F'(pi,qi)) = F'(pi,qi) + 1$$

Returning to FIG. 2, description after step S5 will be continued.

At step S6, when the display unit 40 is not caused to display a display image, that is, when the next image is not generated, the information processing device 10 makes an end determination (YES at step S6) and moves to step S7 described below. On the other hand, when the display unit 40 is not caused to end displaying the display image (NO at step S6), the information processing device 10 moves to step S2 and thus generates a display image. As described above, in the case where the information processing device 10 generates display information (xk,yk and wk and hk) at predetermined time intervals, temporarily stores the generated display information in the storage 12, and then reads the stored display information again and evaluates the read display information, when the end determination is not made (NO at step S6), the information processing device 10 may return to step S4 described above and make the determination process.

After the processes corresponding to all the displayed images ended, at step S7, the setting unit 136 sets regions of interest based on the count values of the respective predetermined regions in the subject image that are stored in the count value storage 122.

The second generator 137 then generates sets of region-of-interest information on the regions of interest that are generated by the setting unit 136 (step S8) and generates a superimposed image in which the sets of region-of-interest information are superimposed onto the subject image (step S9).

Figure 4:
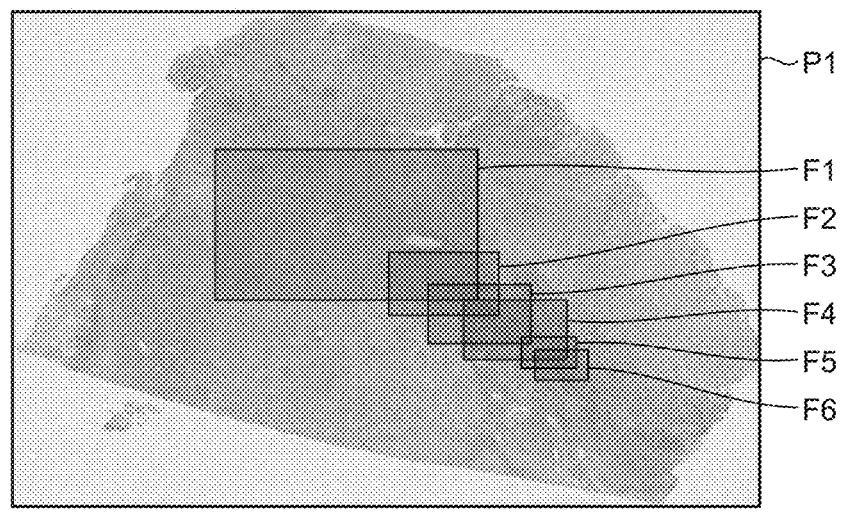
FIG. 4 is a diagram illustrating an example of a superimposed image that a display controller causes a display unit to display according to the first embodiment.

Thereafter, the display controller 138 causes the display unit 40 to display the superimposed image that is generated by the second generator 137 (step S10). FIG. 4 is a diagram illustrating an example of the superimposed image that the display controller 138 causes the display unit 40 to display. As illustrated in FIG. 4, the display controller 138 causes the display unit 40 to display a superimposed image P1 in which sets of region-of-interest information F1 to F6 that are generated by the second generator 137 are superimposed onto the regions of interest that are set in the subject image by the setting unit 136. This allows the user to instinctively know the regions of interest in the subject image. After step S10, the information processing device 10 ends the process.

According to the first embodiment described above, the setting unit 136 is able to present regions that draw much interest in the subject image based on the count values indicating the frequency of display of the respective predetermined regions that are stored in the count value storage 122 (for example, FIG. 4).

According to the first embodiment, the setting unit 136 sets, for the region of interest having more interest, a region having larger count value, and thus the user is able to know importance of each region of interest.

According to the first embodiment, because the setting unit 136 sets, for a region of interest, a region of which count value is larger than the predetermined value, it is possible to exclude regions with a small number of times of display from regions of interest.

According to the first embodiment, because the adder 134 makes an addition to the count value of a region on which the first determination unit 133 determines that the display time is longer than the predetermined time, it is possible to prevent a region that is displayed incorrectly from being set for a region of interest.

Modification 1 of First Embodiment

Modification 1 of the first embodiment will be described. Modification 1 of the first embodiment differs in the addition process that is executed by the adder 134. In the first embodiment described above, display logs are stored and thus the process is performed repeatedly for N times. In Modification 1 of the first embodiment, an addition is made to the frequency of display at predetermined time intervals.

Modification 2 of First Embodiment

Modification 2 of the first embodiment will be described. Modification 2 of the first embodiment differs in the addition process that is executed by the adder 134. Specifically, in Modification 2 of the first embodiment, the frequency of display is weighted according to the magnification of a display region of a display image with respect to a specimen image and an addition is made. Thus, the addition process that is executed by the adder 134 according to Modification 2 of the first embodiment will be described below.

Addition Process

Figure 5:
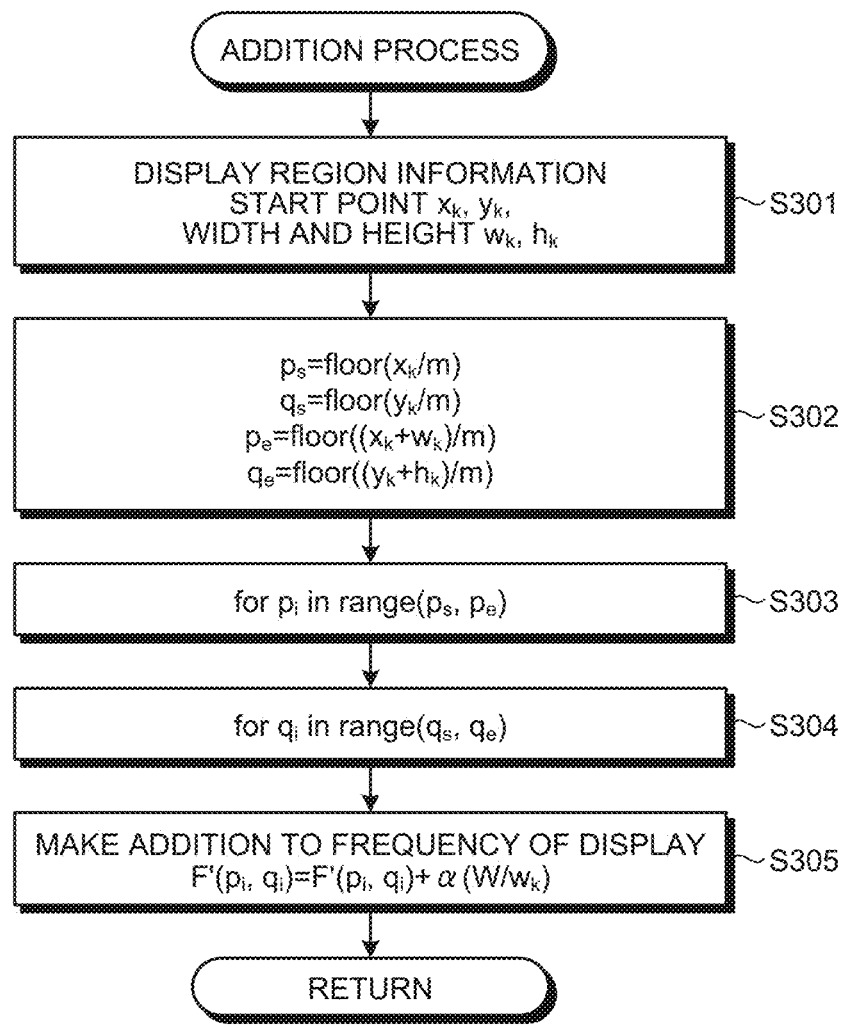
FIG. 5 is a flowchart illustrating an overview of an addition process according to Modification 2 of the first embodiment.

FIG. 5 is a flowchart illustrating an overview of an addition process according to Modification 2 of the first embodiment. In FIG. 5, steps S301 to S304 correspond to steps S101 to S104, respectively, and only step S305 differs. Thus, only step S305 will be described below.

Figure 6:
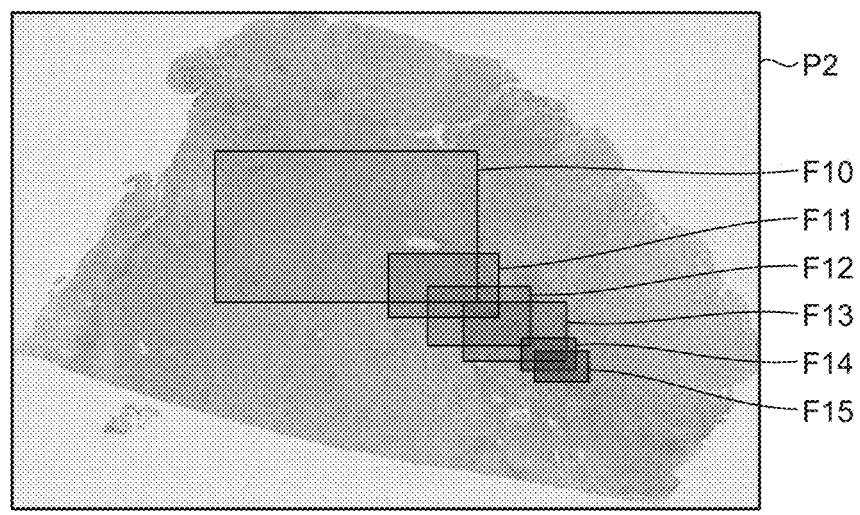
FIG. 6 is a diagram illustrating an example of a superimposed image that the display controller causes the display unit to display according to Modification 2 of the first embodiment.

At step S305, when the whole size of the subject image is denoted by W and the width of the display region of the display image is denoted by wk, the adder 134 makes an addition by adding a display magnification to the count value of frequency of display (F'(pi,qi)=F'(pi,qi)+α(W/wk)). In this case, the adder 134 weights the count value according to each display magnification of the display image as represented by an exponent (α) and incrementally increases the count value. Furthermore, when the display magnification does not exceed a predetermined value, the adder 134 may determine that the user is not gazing the region but observing the whole image and inhibit the frequency of display from being incrementally increased. Accordingly, as illustrated in FIG. 6, the display controller 138 causes the display unit 40 to display a superimposed image P2 in which sets of region-of-interest information F10 to F15 that are generated by the second generator 137 are superimposed onto a region of interest that is set in the subject image by the setting unit 136.

Modification 2 of the first embodiment described above has the same effect as that of the above-described first embodiment and makes it possible to set a more detailed condition on setting of a degree of attention according to the magnification.

According to Modification 2 of the first embodiment, because an addition is made to the count value of a region on which the first determination unit 133 determines that the display region at a subject time is smaller than the display region before and after the subject time, it is possible to set a region of interest in the region that the user gazes.

Modification 3 of First Embodiment

Modification 3 of the first embodiment will be described. Modification 3 of the first embodiment differs in criteria for determination contained in the addition process that is executed by the adder 134. Specifically, in Modification 3 of the first embodiment, a display region of a display image that the display unit 40 currently displays and the display region of the display image that is displayed a predetermined time before the display of the currently-displayed display image or that is displayed a predetermined time after the display of the currently-displayed display are compared to each other and it is determined whether the display magnification is large, thereby making an addition to the count value of frequency of display. The premise of Modification 3 of the first embodiment is that the determination is made after the display region information (xt,yt and wt and ht) on the display image is stored. Thus, as described in step S402 below, it is possible to acquire data before and after the time k on which a determination is made.

Addition Process

Figure 7:
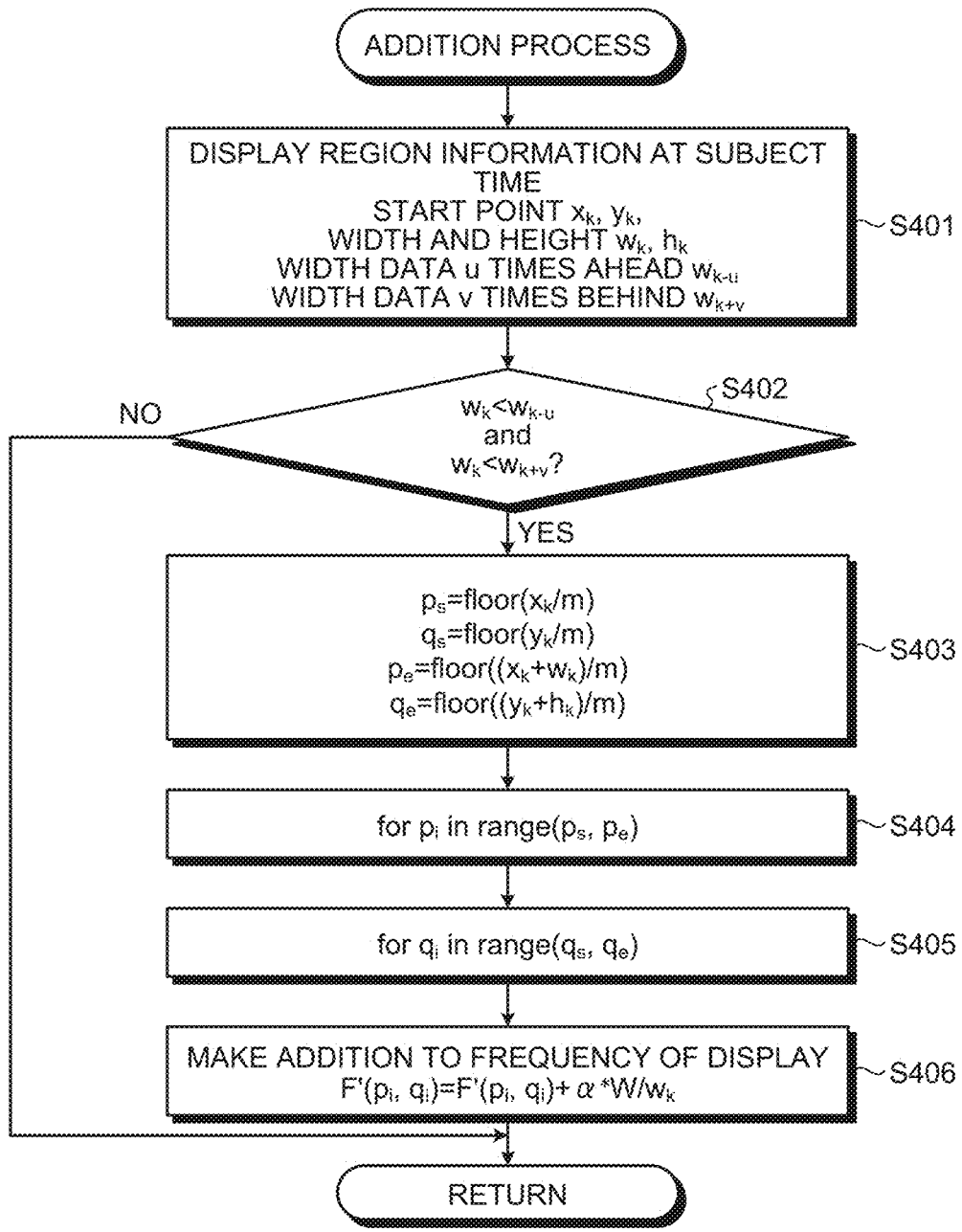
FIG. 7 is a flowchart illustrating an overview of an addition process according to Modification 3 of the first embodiment.

FIG. 7 is a flowchart illustrating an overview of an addition process according to Modification 3 of the first embodiment. In FIG. 7, steps S403 to S405 correspond to steps S102 to S104, respectively. Thus, only steps S401, S402 and S406 will be described below.

At step S401, the adder 134 sets a start point (xk,yk), a width (wk) and a height (hk) of display region information at a subject time (k), a width (wk−u) u times before the subject time, and a width (wk+v) v times after the subject time.

When the width wk at the subject time is smaller than the width wk−u u times before (wk<wk−u) and the width wk at the subject time is smaller than the width wk+v v times after (wk<wk+v) (YES at step S402), this corresponds the determination condition determines whether a magnification rate of displayed region at a subject time is larger than the display region before and after the subject time. The information processing device 10 moves to step S403. In this case, for example, when the user performs an operation of changing the magnification on a display region with respect to a specimen image at 4× magnification, 10× magnification and 4× magnification sequentially (this corresponds condition (wk<wk−u) and (wk<wk+v)), it can be assumed that the user has interest at the 10× magnification display and thus the adder 134 moves to step S405. On the other hand, when the width wk at the subject time is not smaller than the width wk−u u times before (wk≥wk−u) and the width wk at the subject time is not smaller than the width wk+v v times after (wk≥wk+v) (NO at step S402), the information processing device 10 ends the addition process and returns to the main routine in FIG. 2. For example, when The determination unit 133 determines that the user performs an operation of changing the magnification on the display region with respect to the specimen image at 4× magnification, 10× magnification and 20× magnification sequentially, the situation in which the user is assumed to have interest is at 20× magnification observation. Thus, when The determination unit 133 determines that the width wk at the 10× magnification observation, the adder 134 ends the addition process without making an addition to the count value and returns to the main routine.

As described above, because a difference on whether there is a gaze appears even between situations at the same 10× magnification observation based on the result of determination made by The determination unit 133, an addition is made to the count value of frequency of display by setting a degree of attention based not only on the magnification information on the display region but also on magnification information before and after.

Figure 8:
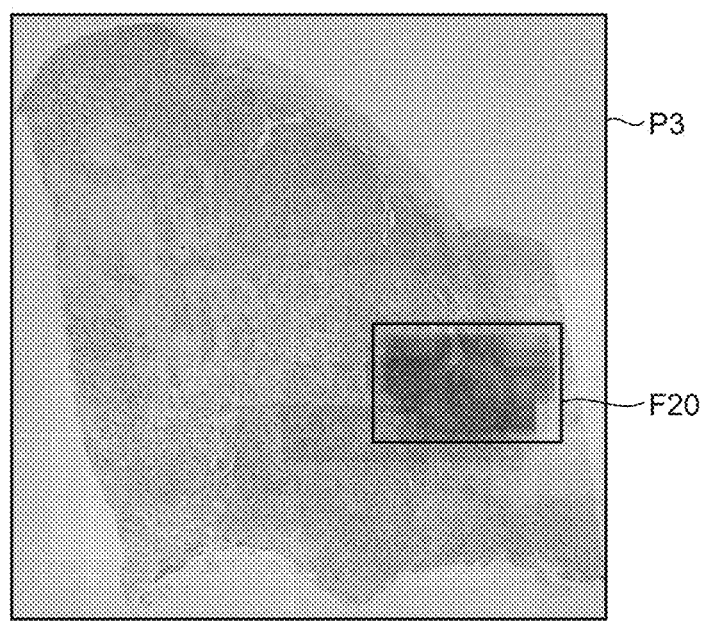
FIG. 8 is a diagram illustrating an example of a superimposed image that the display controller causes the display unit to display according to Modification 3 of the first embodiment.

At step S406, when the whole size of the specimen image is denoted by W and the width of the display region of the display image is wk, the adder 134 makes an addition by adding a display magnification to the count value of frequency of display (F' (pi,qi)=F' (pi,qi)+α×(W/wk)). Accordingly, as illustrated in FIG. 8, the display controller 138 causes the display unit 40 to display superimposed information P3 in which region-of-interest information F20 is superimposed on a region of interest that is set in a subject image by the setting unit 136. After step S406, the adder 134 moves to step S405.

Modification 3 of the first embodiment described above has the same effect as that of the above-described first embodiment and makes it possible to set a more detailed condition on estimation of a region of attention based on a process of changing the magnification.

According to Modification 3 of the first embodiment described above, because the adder 134 weights the value to be added to the count value according to the size of the display region and adds the value, it is possible to make an addition to the count value according to the degree of attention of the user.

Modification 4 of First Embodiment

Modification 4 of the first embodiment will be described. Modification 4 of the first embodiment differs in the addition process that is executed by the adder 134. Specifically, in Modification 4 of the first embodiment, an addition is made to the count value of frequency of display according to deviations of n sets of data in the past. Thus, the addition process executed by the adder 134 according to Modification 4 of the first embodiment will be described below.

Addition Process

Figure 9:
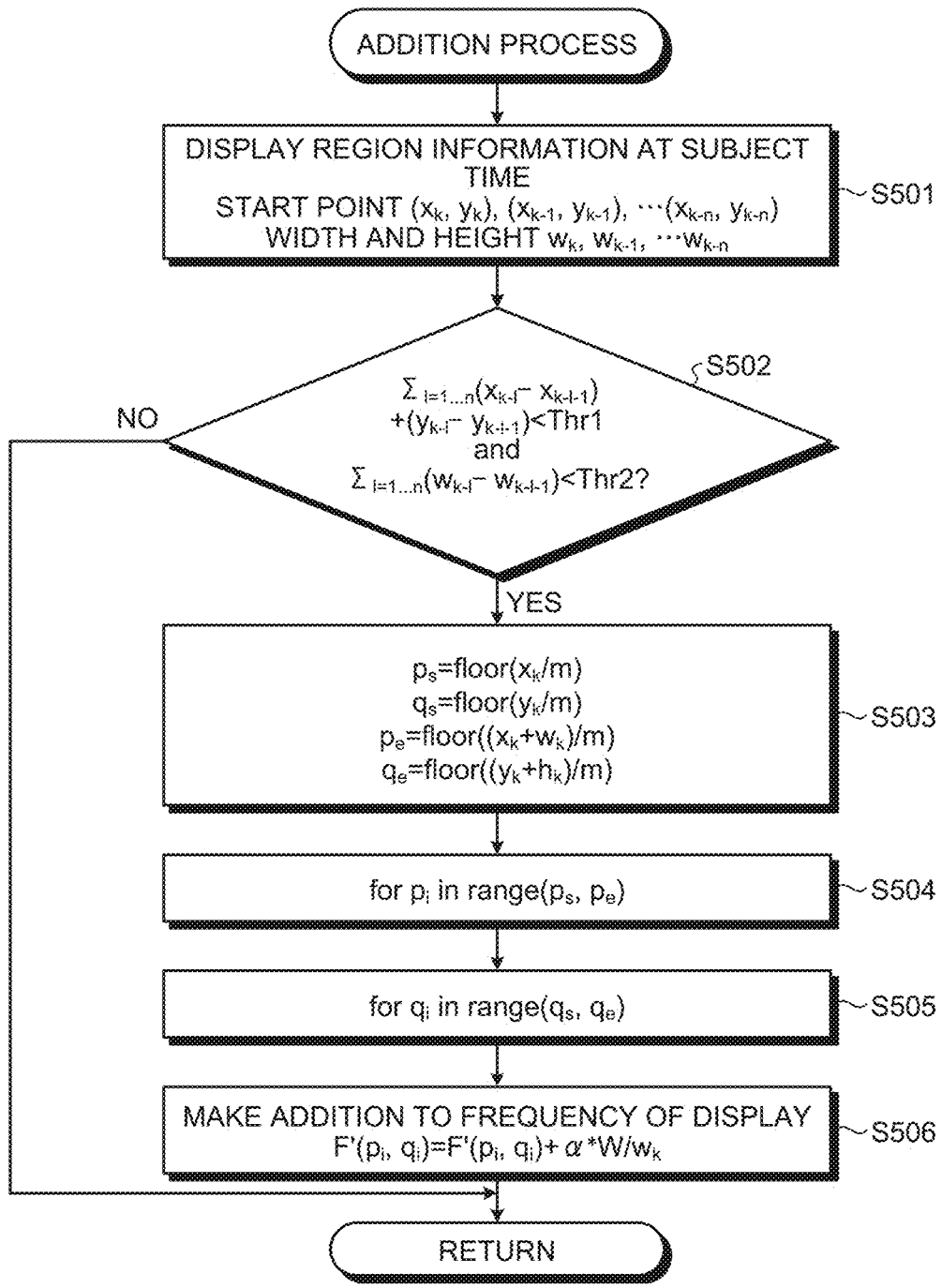
FIG. 9 is a flowchart illustrating an overview of an addition process according to Modification 4 of the first embodiment.

FIG. 9 is a flowchart illustrating an overview of the addition process according to Modification 4 of the first embodiment. In FIG. 9, steps S503 to S506 correspond to steps S403 to S406 described above, respectively, and only steps S501 and S502 are different. Steps S501 and S502 will be described below.

As illustrated in FIG. 9, the adder 134 sets start points (xk,yk), (xk−1,yk−1), . . . , (xk−n,yk−n), widths (wk), (wk−1), . . . , (wk−n) and heights (hk), (hk−1), . . . , (hk−n) of display region information at a subject time (step S501).

The determination unit 133 then determines whether the sum of deviations of n sets of data in the past is equal to or smaller than a predetermined value (Thr1, Thr2) (step S502). When The determination unit 133 determines that the sum of deviations of n sets of data in the past is equal to or smaller than a predetermined value (YES at step S502), the information processing device 10 moves to step S503. On the other hand, when The determination unit 133 determines that the sum of deviations of n sets of data in the past is not equal to or smaller than a predetermined value (NO at step S502), the information processing device 10 returns to the above-described main routine in FIG. 2.

Figure 10:
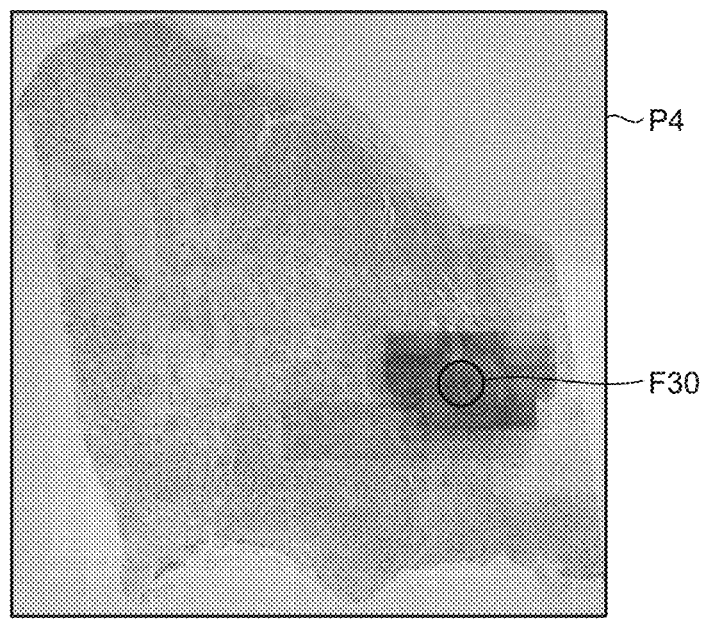
FIG. 10 is a diagram illustrating an example of a superimposed image that the display controller causes the display unit to display according to Modification 4 of the first embodiment.

As described above, because a difference on whether there is a gaze appears even between situations at the same 10× magnification observation based on the result of determination made by The determination unit 133, an addition is made to the count value of frequency of display by supposing a degree of attention based not only on the magnification information on the display region but also on magnification information before and after. Accordingly, as illustrated in FIG. 10, the display controller 138 causes the display unit 40 to display superimposed information P4 in which region-of-interest information F30 is superimposed onto a region of interest that is set in a subject image by the setting unit 136.

Modification 4 of the first embodiment described above has the same configuration as that of the above-described first embodiment and makes it possible to set a detailed condition on estimating a region of attention in consideration of the deviations of the display region.

According to Modification 4 of the first embodiment, because the adder 134 makes an addition to the count value of the region on which the determination unit 133 determines that the sum of the deviations is equal to or smaller than the predetermined value, it is possible to assuredly makes an addition to the count value with respect to the region that is gazed by the user.

Second Embodiment

A second embodiment will be described. In the first embodiment, a region of interest is set based on the count value of frequency of display and thus the region of interest is displayed in a superimposed manner on a subject image. In the second embodiment, after features of a subject image are analyzed, image segmentation is performed based on the features and a similarity region similar to the region of interest is extracted. A configuration of an information processing system according to the second embodiment will be described below. The same components as those of the information processing system according to the first embodiment described above are denoted with the same reference numbers and detailed description thereof will be omitted.

Configuration of Information Processing System

Figure 11:
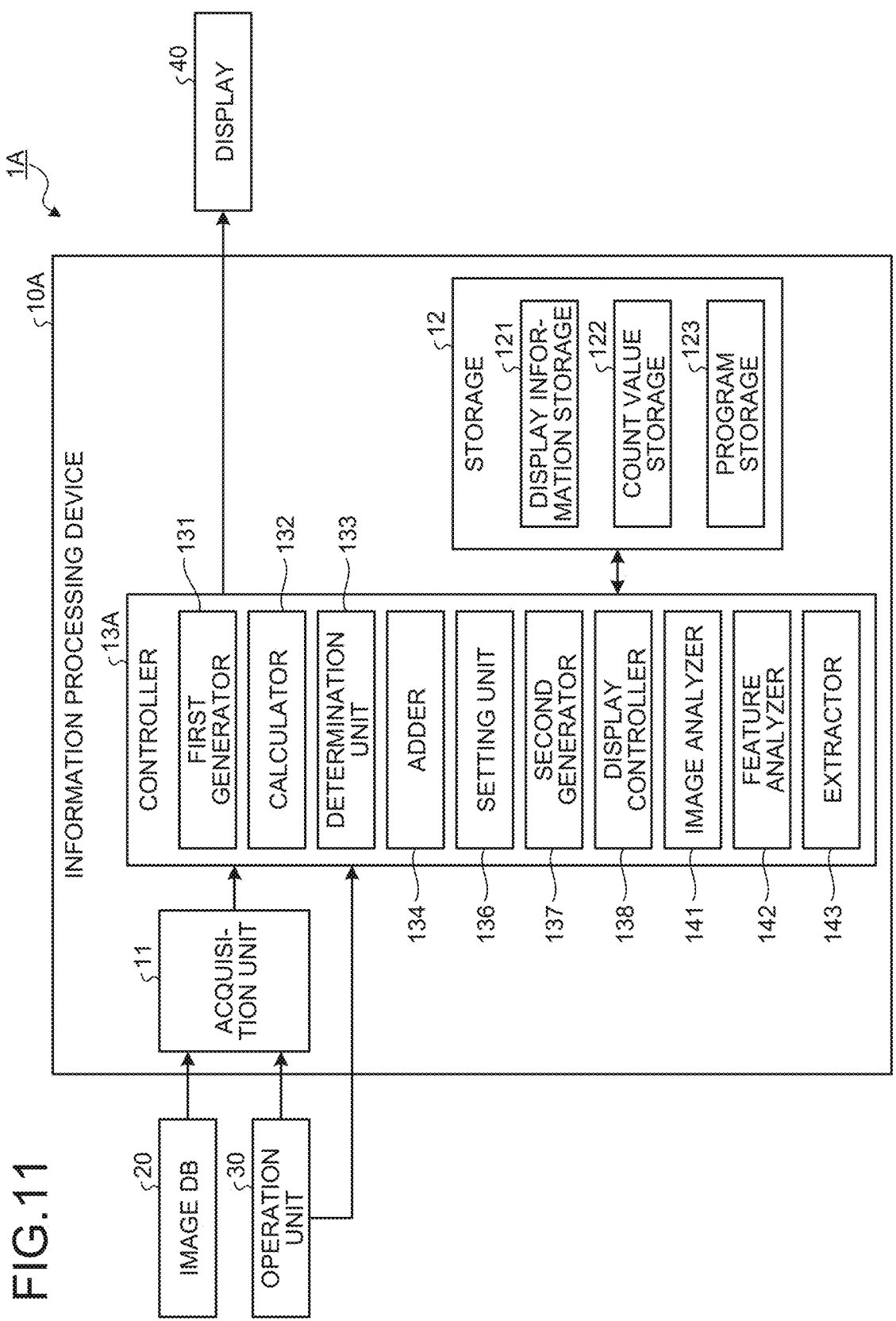
FIG. 11 is a block diagram illustrating a functional configuration of an information processing system according to a second embodiment.

FIG. 11 is a block diagram illustrating a functional configuration of the information processing system according to the second embodiment. An information processing system 1A illustrated in FIG. 11 includes an information processing device 10A instead of the information processing device 10 according to the above-described first embodiment.

Configuration of Information Processing Device

The information processing device 10A includes a controller 13A instead of the controller 13 according to the above-described first embodiment. Furthermore, the controller 13A further includes an image analyzer 141, a feature analyzer 142, and an extractor 143 in addition to the components of the controller 13 according to the above-described first embodiment.

The image analyzer 141 performs a known analysis process of analyzing features on a specimen image that is acquired by the acquisition unit 11 and performs segmentation on the specimen image according to each feature.

The feature analyzer 142 analyzes each of features of a plurality of regions of interest that region set by the setting unit 136.

The extractor 143 compares the segmentation according to each feature that is analyzed by the image analyzer 141 and each of the features of the regions of interest that are analyzed by the feature analyzer 142 and extracts a similar region that is similar to the region of interest.

Figure 12:
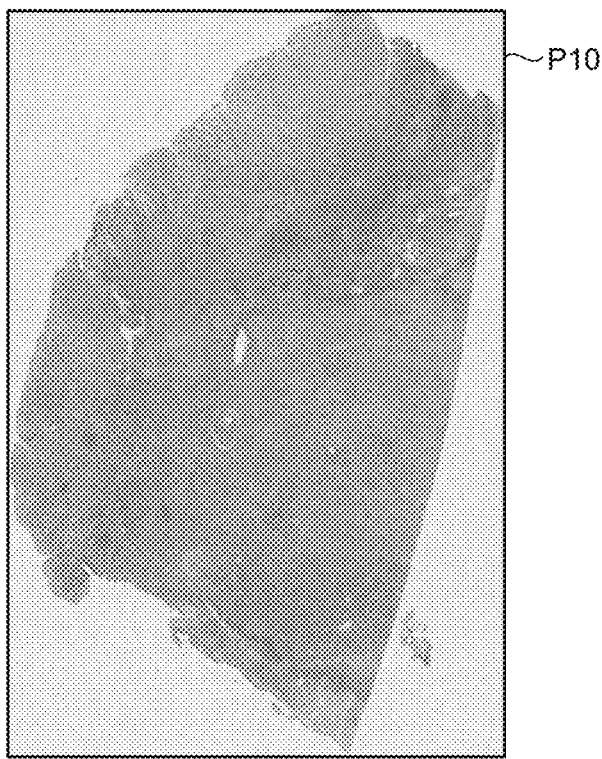
FIG. 12 is a diagram schematically illustrating an example of a first image that is acquired by an acquisition unit according to the second modification.

In the information processing device 10A configured as described above, first of all, the acquisition unit 11 outputs image data corresponding to an operation on the operation unit 30 from the image DB 20. Specifically, as illustrated in FIG. 12, the acquisition unit 11 acquires a subject image P10 corresponding to the image data.

Figure 13:
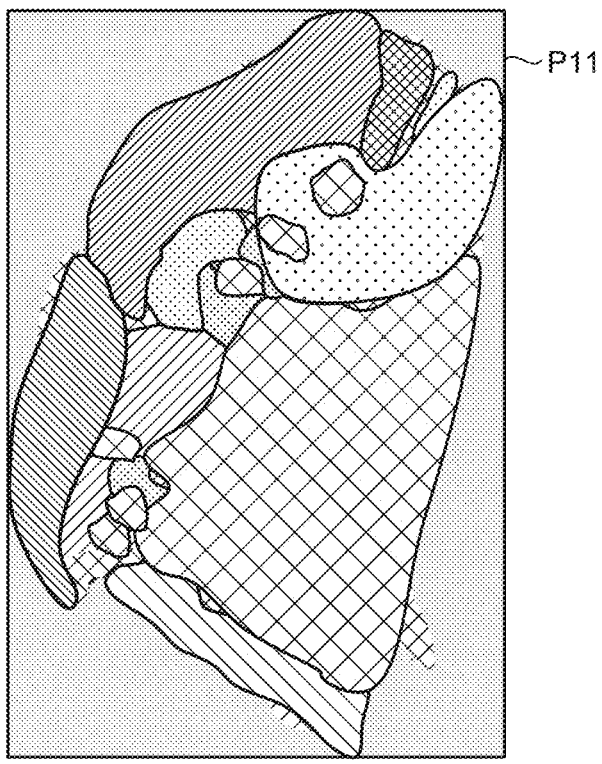
FIG. 13 is a diagram schematically illustrating an example of the first image on which segmentation has been performed.

Subsequently, the image analyzer 141 performs a known analysis process of analyzing features on the subject image that is acquired by the acquisition unit 11 and performs segmentation on the subject image according to each feature. Specifically, as illustrated in FIG. 13, the image analyzer 141 performs the known analysis process of analyzing the features on the subject image P10 that is acquired by the acquisition unit 11 and generates an image P11 obtained by performing segmentation on the subject image P10 according to each feature.

Figure 14:
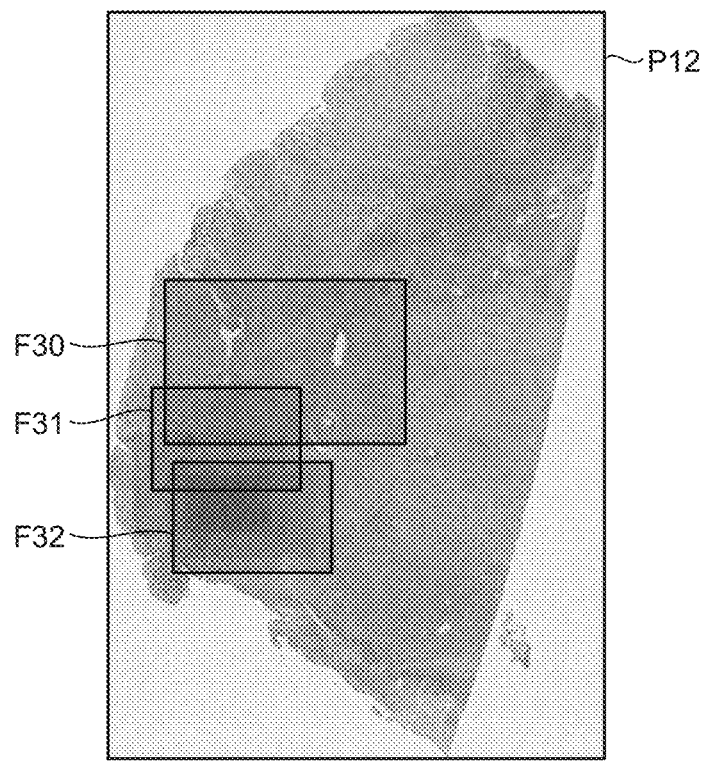
FIG. 14 is a diagram schematically illustrating an example of a superimposed image.

The feature analyzer 142 then analyzes each of the features of the regions of interest that are set by the setting unit 136. Specifically, as illustrated in FIG. 14, the feature analyzer 142 analyzes each of the features of the regions of interest F30 to F32 in the subject image P10 that are set by the setting unit 136. FIG. 14 schematically presents the regions of interest with rectangular frames but embodiments are not limited thereto. For example, the higher the count value of frequency of display is, the darker the region of interest may be displayed.

Figure 15:
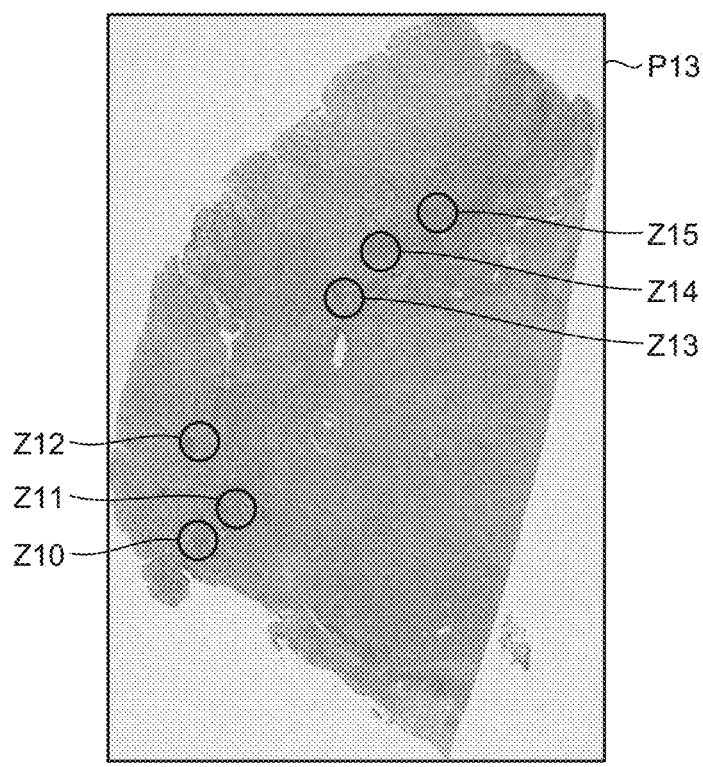
FIG. 15 is a diagram schematically illustrating an example of a similar region.

The extractor 143 compares the segmentation according to each feature that is analyzed by the image analyzer 141 and each of the features of the regions of interest that are analyzed by the feature analyzer 142 and extracts a similar region that is similar to the region of interest. Specifically, as illustrated in FIG. 15, the extractor 143 extracts similar regions Z11 to Z15 that are similar to a region of interest Z1 from the subject image P10. In this case, the display controller 138 may display the similar regions Z11 to Z15 that are extracted by the extractor 143 on a subject image P13 in a superimposed manner and thus causes the display unit 40 to display the similar regions Z11 to Z15. The display controller 138 may cause the display unit 40 to display each of the similar regions Z11 to Z15, which are extracted by the extractor 143, sequentially in full screen at predetermined time intervals.

According to the second embodiment described above, it is possible to present regions of interest by simple operations.

According to the second embodiment, because the extractor 143 compares the segmentation according to each feature that is analyzed by the image analyzer 141 and each of the features of the regions of interest that are analyzed by the feature analyzer 142 and extracts a similar region that is similar to the region of interest, it is possible to prevent a region on which observation on the subject image is performed from being missed and, because similar regions are observed preferentially, it is possible to effectively perform observation on the subject image.

Third Embodiment

A third embodiment will be described next. In the third embodiment, features of a region of interest are analyzed and an image database is searched, using the result of the analysis as a query. A configuration of the information processing system according to the third embodiment will be described below. The same components as those of the information processing systems 1 and 1A according to the first and second embodiments described above are denoted with the same reference numbers and detailed description thereof will be omitted.

Configuration of Information Processing System

Figure 16:
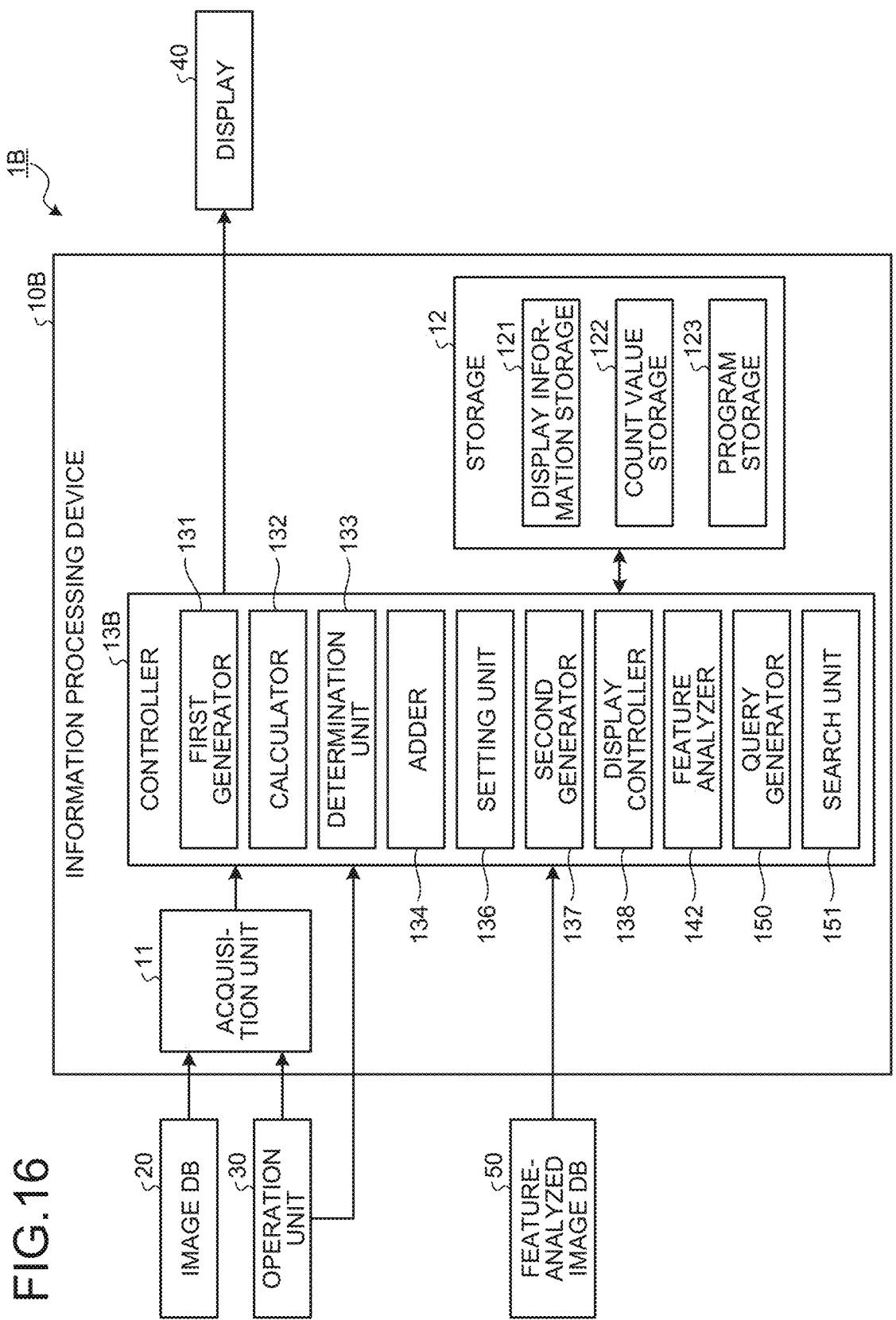
FIG. 16 is a block diagram illustrating a functional configuration of an information processing system according to a third embodiment.

FIG. 16 is a block diagram illustrating a functional configuration of the information processing system according to the third embodiment. An information processing system 1B illustrated in FIG. 16 includes an information processing device 10B instead of the information processing device 10 of the information processing system 1 according to the above-described first embodiment. The information processing system 1B further includes a feature-analyzed image database 50 that stores multiple sets of image data of which features have been analyzed ("feature-analyzed image DB 50").

Configuration of Information Processing Device

The information processing device 10B includes a query generator 150 and a search unit 151 instead of the image analyzer 141 and the extractor 143 of the controller 13A according to the second embodiment described above and has the same components as those of the controller 13A excluding the query generator 150 and the search unit 151.

The query generator 150 generates a query for searching the sets of image data for similar image data based on the region-of-interest features that are analyzed by the feature analyzer 142. Specifically, the query generator 150 generates a query with respect to each of the region-of-interest features that are analyzed by the feature analyzer 142.

Based on the query that is generated by the query generator 150, the search unit 151 searches the feature-analyzed image DB 50 for multiple sets of similar image data and acquires the sets of similar image data.

In the information processing device 10B configured as described above, the search unit 151 searches the feature-analyzed image DB 50 for multiple sets of similar image data based on the query that is generated by the query generator 150, thereby acquiring the sets of similar image data similar in features to the region of interest. The display controller 138 then causes the display unit 40 to display similar images corresponding to the sets of similar image data that are acquired by the search unit 151.

The third embodiment described above has the same effect as that of the first embodiment described above and makes it possible to present a region of interest of an image by simple operations.

According to the third embodiment, because the search unit 151 searches the feature-analyzed image DB 50 for multiple sets of similar image data based on a query that is granted by the query generator 150 and thus acquires the sets of similar image data similar in features to a region of interest, it is possible to have an observation while making a compression with the similar images corresponding to the sets of similar image data.

Fourth Embodiment

A fourth embodiment will be described next. In the fourth embodiment, a region of interest is set based on frequency of display in the display region in an image corresponding to image data that is captured by a microscope. A configuration of an information processing system according to the fourth embodiment will be described. The same components as those of the information processing system 1 according to the first embodiment are denoted with the same reference numbers and detailed description thereof will be omitted.

Configuration of Information Processing System

Figure 17:
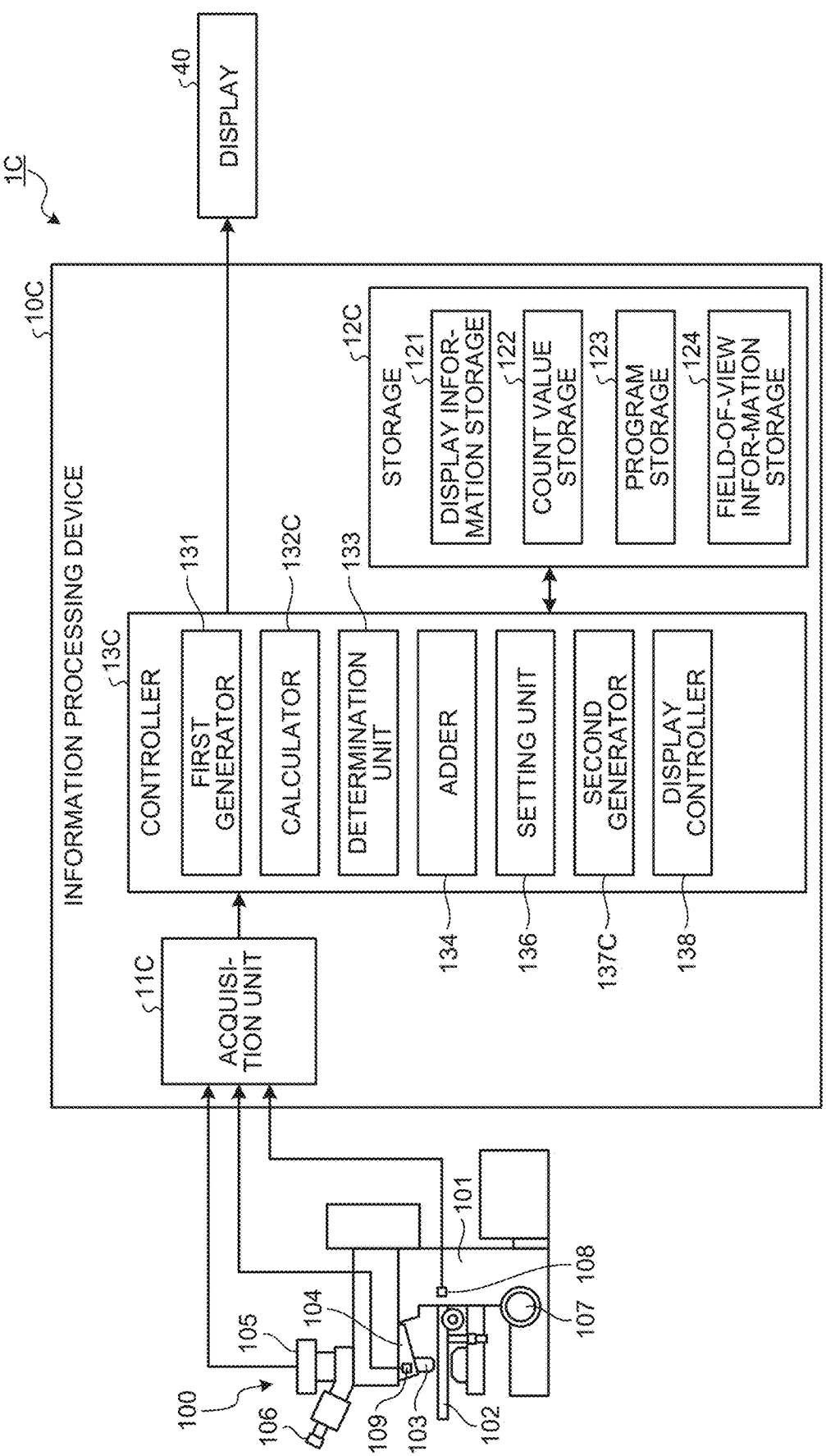
FIG. 17 is a schematic diagram illustrating a functional configuration of an information processing system according to a fourth embodiment.

FIG. 17 is a schematic diagram illustrating a functional configuration of the information processing system according to the fourth embodiment. An information processing system 1C illustrated in FIG. 17 includes an information processing device 10C, the display unit 40, and a microscope 100.

The information processing device 10C acquires image data from the microscope 100 and causes the display unit 40 to display an image corresponding to the acquired image data. A detailed configuration of the information processing device 10C will be described below.

The microscope 100 includes a casing 101 having an approximately C shape; a stage 102 that is attached to the casing 101 movably in three-dimensional directions; and a plurality of objective lenses 103 having observation magnifications different from one another; a revolver 104 that arranges a desired objective lens 103 according to an operation of the user; an imaging unit 105 consisting of a charge coupled device (CCD), a complementary metal oxide semiconductor (CMOS), or the like, that captures an image of a specimen that is placed on the stage 102 via the objective lens 103; an eyepiece 106 for observing an observation image of the specimen via the objective lens 103; an operation unit 107 that causes the stage 102 to move in the three-dimensional directions according to an operation of the user; a position detector 108 that detects the position of the stage 102 with respect to a reference position and that consists of an encoder, or the like; and a magnification detector 109 that detects magnification information indicating an observation magnification at which the microscope 100 observes the specimen. In the fourth embodiment, the microscope 100 functions as an observation device. Furthermore, in the fourth embodiment, the objective lens 103 functions as an observation optical system.

Configuration of Information Processing Device

The detailed configuration of the information processing device 10C will be described. The information processing device 10C includes an acquisition unit 11C, a storage 12C and a controller 13C instead of the acquisition unit 11, the storage 12 and the controller 13 according to the first embodiment described above.

The acquisition unit 11C acquires image data from the imaging unit 105 of the microscope 100. The acquisition unit 11C further acquires, as an instruction signal, position information on the position of the stage 102 from the position detector 108 and magnification information from the magnification detector 109.—

The storage 12C further includes a field-of-view information storage 124 in addition to the components of the storage 12 according to the above-described first embodiment. The field-of-view information storage 124 stores a position in which an object is selected by the microscope 100 and field-of-view information indicating at least the size of the field of view of the microscope 100. Furthermore, the field-of-view information storage 124 stores the field-of-view information in which coordinate information indicating the positon of the field of view in a coordinate system based on a field is contained.

The controller 13C includes a calculator 132C and a second generator 137C instead of the calculator 132 and the second generator 137 of the controller 13 according to the above-described first embodiment.

Based on position information on the stage 102 that is detected by the position detector 108 and magnification information that is detected by the magnification detector 109, the calculator 132C calculates a display region (region of field of view) of an image corresponding to the image data that is generated by the imaging unit 105 and stores the result of the calculation in the display information storage 121.

The second generator 137C generates a superimposed image in which a region of interest that is set by the setting unit 136 is superimposed onto a live view image that is generated by the first generator 131 based on the result of the calculation by the calculator 132.

Figure 18:
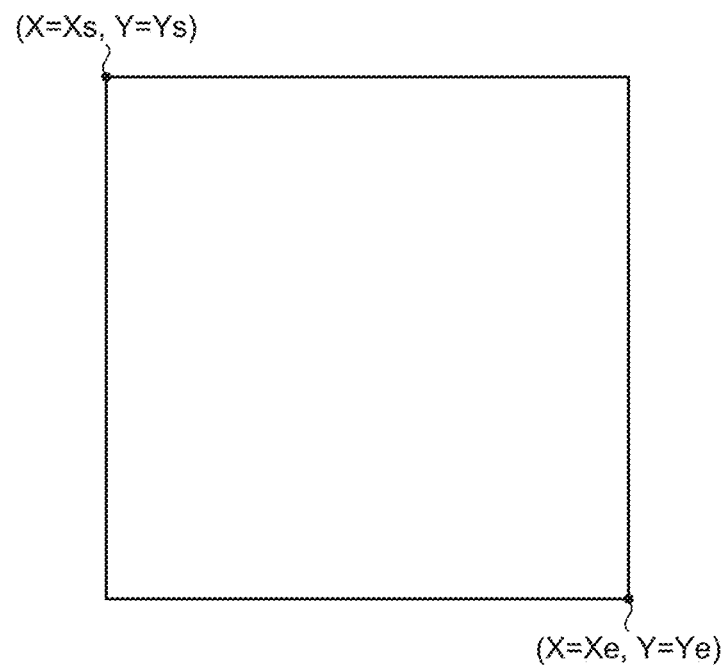
FIG. 18 is a diagram schematically illustrating a stage according to the forth embodiment.
Figure 19:
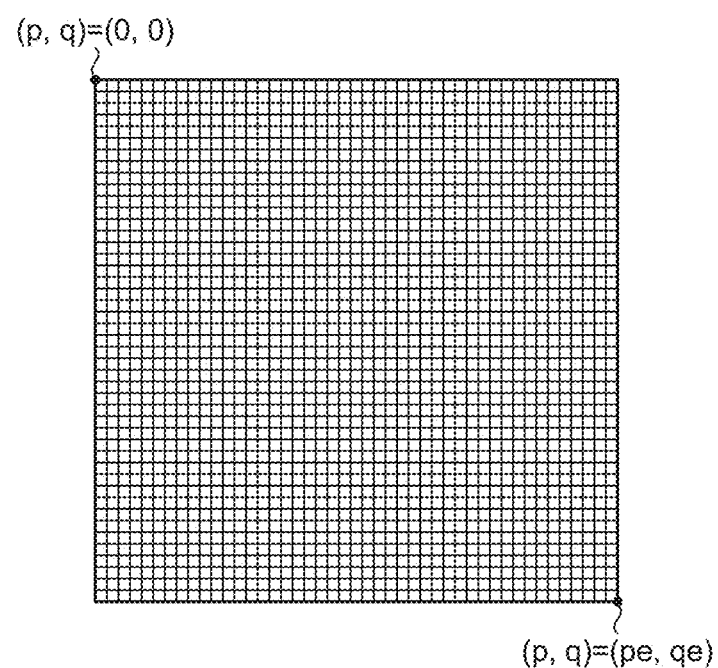
FIG. 19 is a diagram schematically illustrating registers corresponding to the stage according to the forth embodiment.
Figure 20:
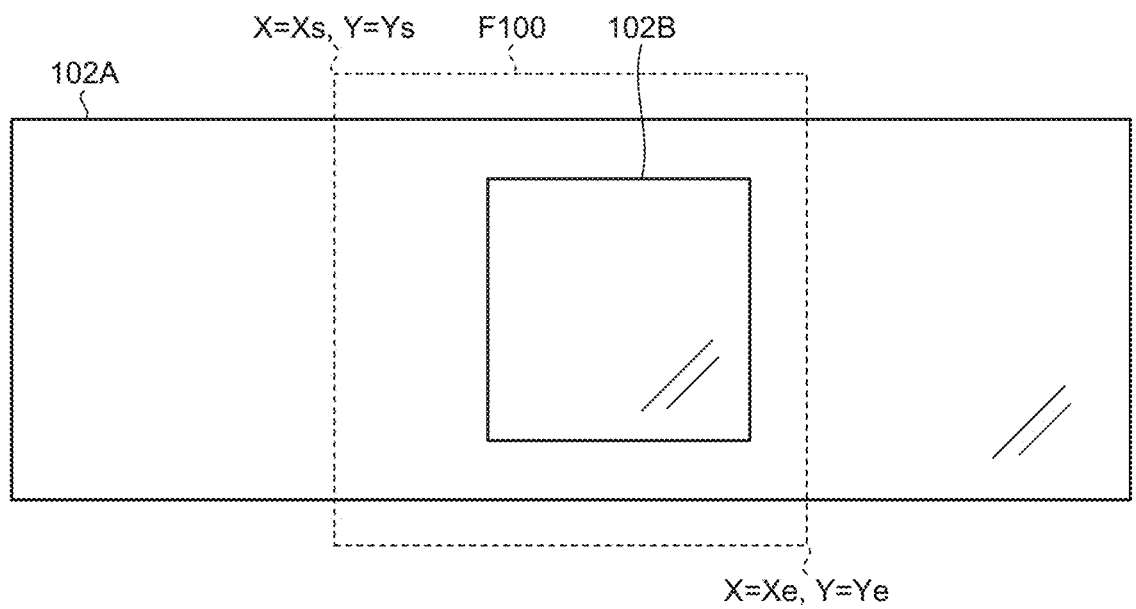
FIG. 20 is a diagram schematically illustrating an example of a superimposed image according to the fourth embodiment.

The method of making an addition to a count value of frequency of display in the display region that is executed by the information processing system 1C configured as described above will be described. FIG. 18 is a diagram schematically illustrating the stage 102. FIG. 19 is a diagram schematically illustrating registers corresponding to the stage 102. FIG. 20 is a diagram schematically illustrating the position of a cover glass 102B on a slide glass 102A.

As illustrated in FIGS. 18 and 19, when the coordinates of a reference positon of the start of the display region on an object surface that is calculated by the calculator 132C are (Xs,Ys), the coordinates of the position of the end of the display region are (X,Y)=(Xe,Ye), the coordinates of the position of the start of the registers for making an addition to the frequency of display are (0,0)=(p,q), and the coordinates of the position of the end of the registers are (pe,qe), the display region is set with a margin such that the cover glass 102B on the slide glass 102A is contained.

Based on the position information on the stage 102 that is detected by the position detector 108, the calculator 132C calculates a position on the object surface (subject) corresponding to an optical center axis based on the positional relationship between the stage 102 and the imaging unit 105 as the display region information or the position in which the subject is selected and thus specifies the position. Furthermore, based on the magnification information that is detected by the magnification detector 109, the calculator 132C calculates, as the display region information, the selection position on the object surface corresponding to a viewing angle (display region) with respect to the optical center position in the coordinate system based on the field and thus specifies the position. Accordingly, based on the display region information (observation field-of-view information) on the subject surface that is acquired by the calculator 132C, the adder 134 performs an addition process of making an addition to a count value of frequency of display by performing the addition process of any one the first embodiment and Modifications 1 to 4 according to the first embodiment that are described above.

Based on the count value to which the adder 134 has made an addition, the setting unit 136 sets a region of interest indicating which position is with high frequency of display in the whole specimen and draws interest. Specifically, based on the count value that is added by the adder 134, the setting unit 136 sets a region of interest indicating which position has high frequency of display and draws much interest in the coordinate system corresponding to the whole specimen.

Figure 21:
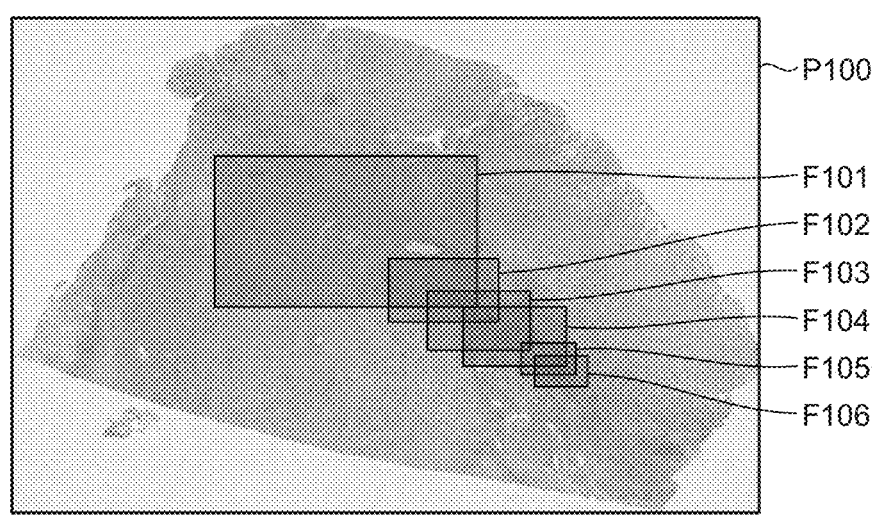
FIG. 21 is a diagram schematically illustrating a position of a cover glass on a slide glass according to the fourth embodiment.

As illustrated in FIG. 21, the second generator 137C generates a superimposed image P100 in which regions of interest F101 to F106 are superimposed onto a subject image that is obtained by capturing an image of the whole specimen. In this case, as illustrated in FIG. 14, the second generator 137C generates the superimposed image P100 such that the higher the count value of a region of interest is, the darker the region of interest is displayed relative to other pixels. Accordingly, the user and other observers are able to instinctively know the regions of interest that draw interest of the user.

According to the fourth embodiment described above, it is possible to present a region of interest in a specimen image by simple operations.

Modification 1 of Fourth Embodiment

Modification 1 of the fourth embodiment will be described. In Modification 1 of the fourth embodiment, when the same slide is observed again, the display unit 40 is caused to display a region of interest in a superimposed manner on a live view image corresponding to image data that is generated by the imaging unit 105. The same components as those of the information processing system 1C according to the fourth embodiment described above are denoted with the same reference numbers and detailed description thereof will be omitted.

Configuration of Information Processing System

Figure 22:
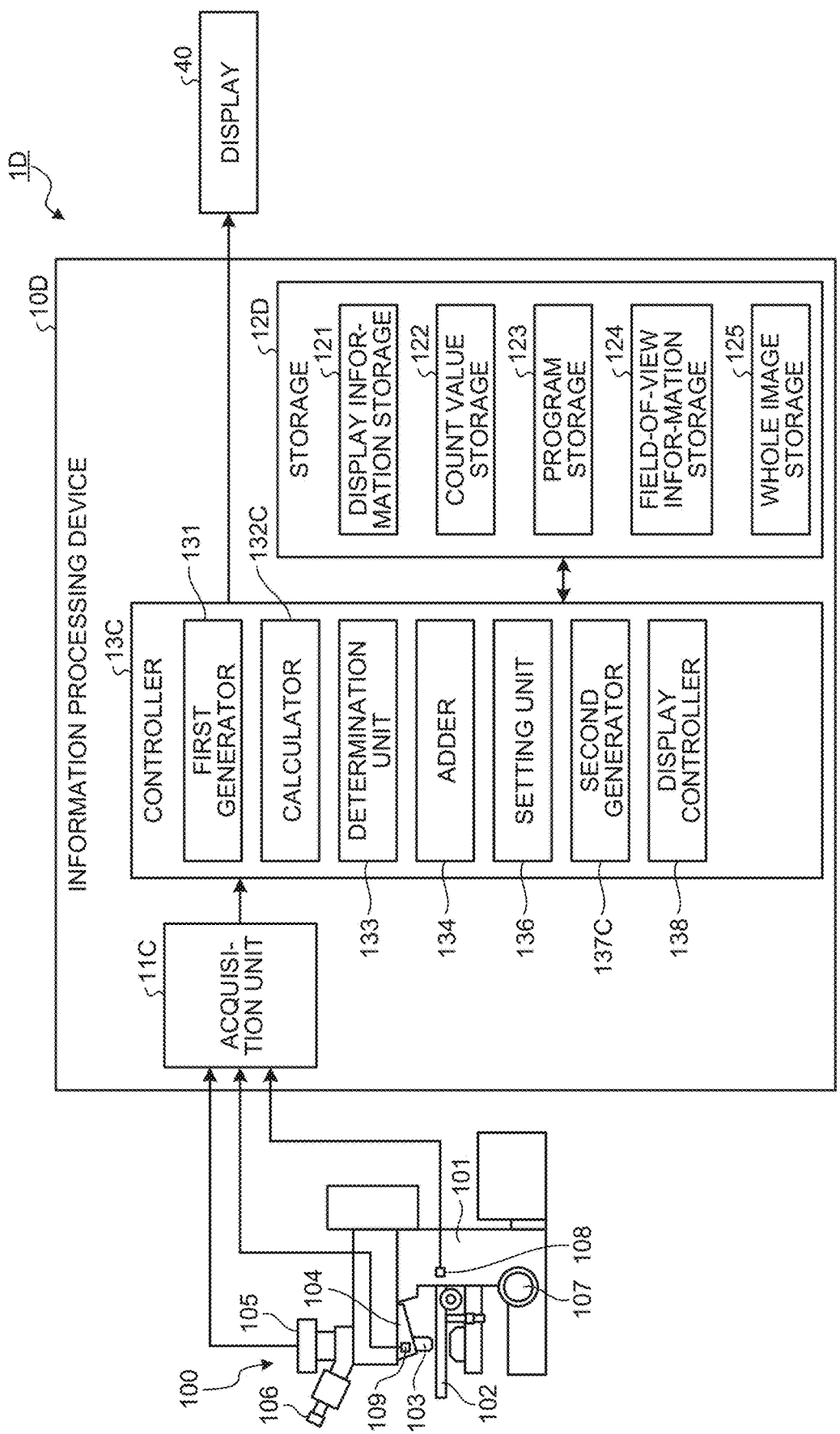
FIG. 22 is a schematic diagram illustrating a functional configuration of an information processing system according to Modification 1 of the fourth embodiment.

FIG. 22 is a schematic diagram illustrating a functional configuration of an information processing system according to Modification 1 of the fourth embodiment. An information processing system 1D illustrated in FIG. 22 includes an information processing device 10D instead of the information processing device 10C of the information processing system 1C according to the above-described fourth embodiment.

Configuration of Information Processing Device

The information processing device 10D includes a storage 12D instead of the storage 12C of the information processing device 10C according to the above-described fourth embodiment. The storage 12D includes, in addition to the components of the storage 12C according to the fourth embodiment, a whole image storage 125 that stores a specimen image, position information on the stage, and count values of frequency of display in association with each other.

In the information processing system 1D configured as described above, because the subject surface is not based on the position of the specimen but based on the position of the stage 102, even when a positional shift occurs in the case where the slide glass 101A containing the specimen is detached from the stage 102 and then is placed on the stage 102 again, it is possible to display a region of interest in a superimposed manner on the live view image on the display unit 40 when the same specimen is observed again because the whole image storage 125 stores the subject image (specimen image), the position information on the stage, and the count value of frequency of display in association with one another.

According to Modification 1 of the above-described fourth embodiment, it is possible to present a region of interest in a specimen image by simple operations.

Modification 2 of Fourth Embodiment

Modification 2 of the fourth embodiment will be described. In Modification 2 of the fourth embodiment, the display unit 40 is caused to display a region of interest in a superimposed manner on a live view image by performing alignment using a whole specimen image. The same components as those of the information processing system 1D according to the fourth embodiment described above are denoted with the same reference numbers and detailed description thereof will be omitted.

Configuration of Information Processing System

Figure 23:
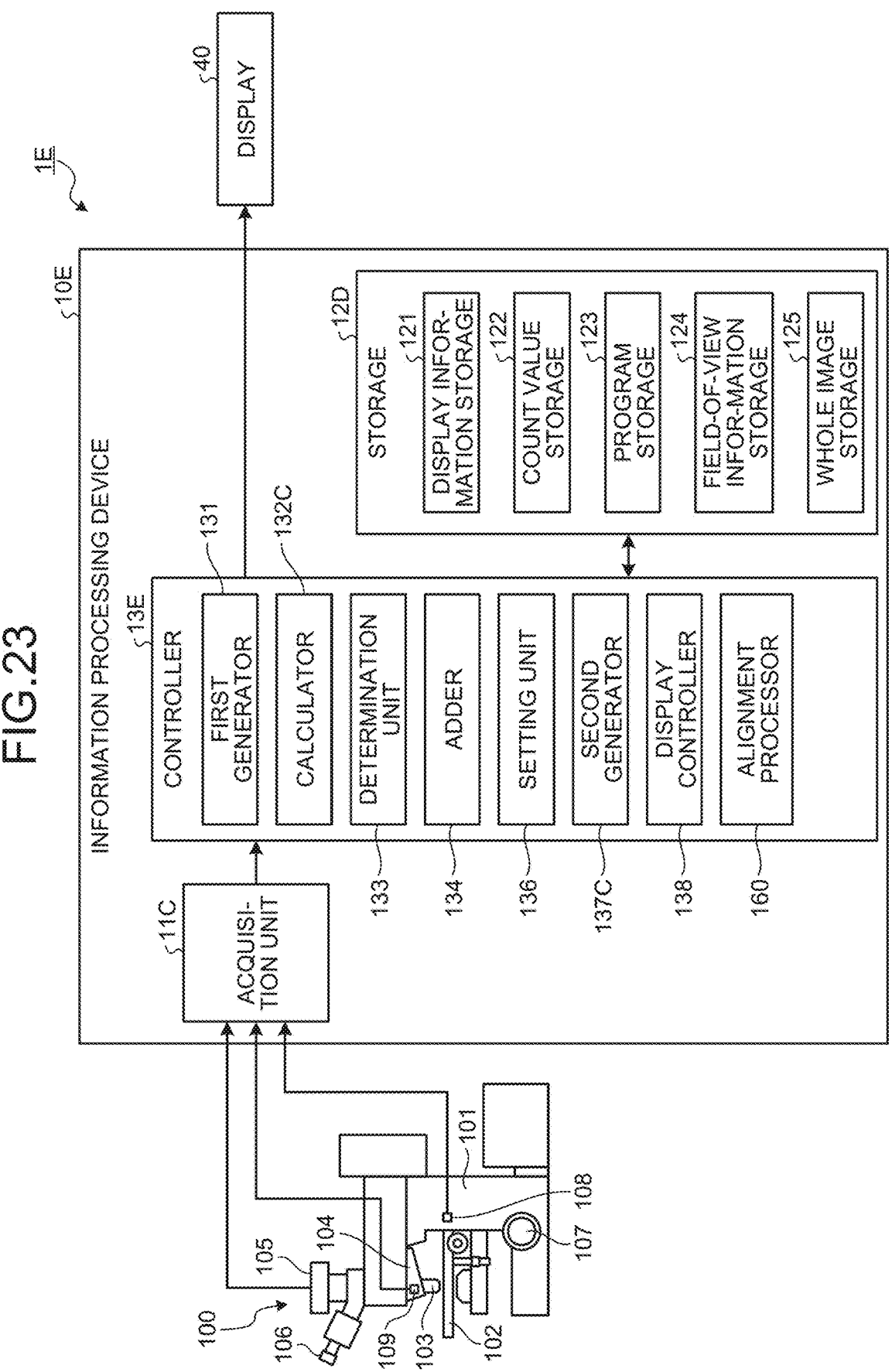
FIG. 23 is a schematic diagram illustrating a functional configuration of an information processing system according to Modification 2 of the fourth embodiment.

FIG. 23 is a schematic diagram illustrating a functional configuration of an information processing system according to Modification 2 of the fourth embodiment. An information processing system 1E illustrated in FIG. 23 includes an information processing device 10E instead of the information processing device 10D of the information processing system 1D according to Modification 1 of the above-described fourth embodiment.

Configuration of Information Processing Device

The information processing device 10E includes a controller 13E instead of the controller 13C of the information processing device 10D according to Modification 1 of the above-described fourth embodiment. The controller 13E further includes an alignment processor 160 in addition to the components of the controller 13C according to Modification 1 of the above-described fourth embodiment.

The alignment processor 160 performs an alignment process of making an alignment between the image corresponding to the image data that is acquired by the acquisition unit 11C from the microscope 100 and a specimen image corresponding to the whole image data obtained in the previous observation that is stored in the whole image storage 125.

The information processing system 1E configured as described above is able to, when the user observes a specimen again, display a region of interest in a superimposed manner on a live view image at the re-observation by acquiring a display region at the re-observation because the position of an object surface at the re-observation is associated with the position of display of the live view image based on the count values of frequency of display in the display region that are stored in the count value storage 122.

According to Modification 2 of the fourth embodiment described above, it is possible to present a region of interest in a specimen image by simple operations.

Modification 3 of Fourth Embodiment

Modification 3 of the fourth embodiment will be described. In Modification 3 of the fourth embodiment, a region of interest is superimposed onto an observation image. The same components as those of the information processing system 1C according to the fourth embodiment described above are denoted with the same reference numbers and detailed description thereof will be omitted.

Configuration of Information Processing System

Figure 24:
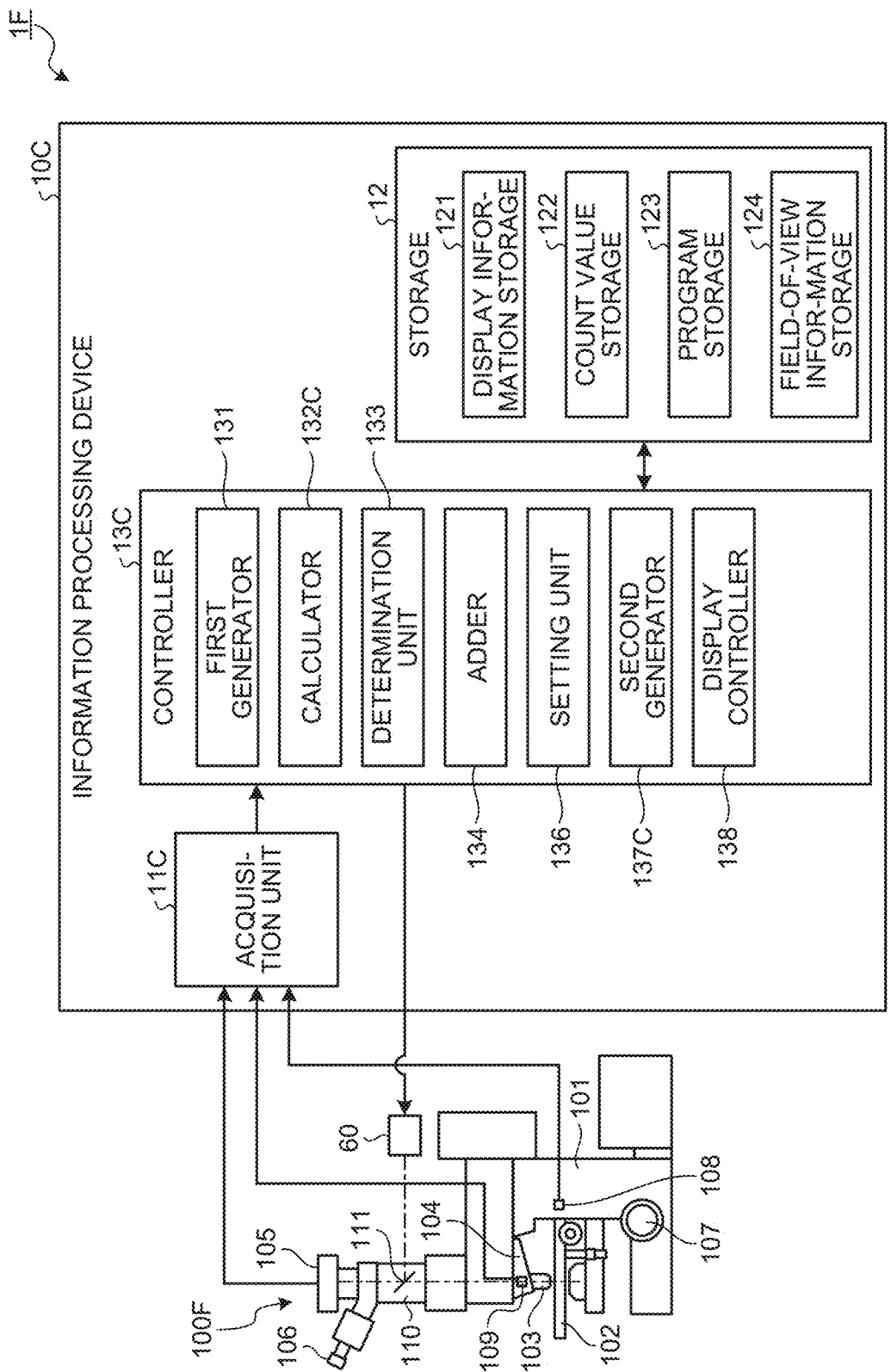
FIG. 24 is a schematic diagram illustrating a functional configuration of an information processing system according to Modification 3 of the fourth embodiment.

FIG. 24 is a schematic diagram illustrating a functional configuration of an information processing system according to Modification 3 of the fourth embodiment. An information processing system 1F illustrated in FIG. 24 includes a microscope 100F instead of the microscope 100 according to the above-described fourth embodiment.

The microscope 100F includes, in addition to the components of the microscope 100 according to the above-described fourth embodiment, an intermediate lens-barrel 110, a half mirror 111 that transmits an observation image that is formed by the objective lens 103 to the imaging unit 105 and the eyepiece 106 and reflects an image that is emitted from a display unit 60 to be described below to the imaging unit 105 and the eyepiece 106, and the display unit 60 that emits an image to the half mirror 111 under the control of the controller 13C.

The information processing system 1F configured as described above has correspondence in the count value of frequency of display in a display region on a subject surface and thus acquiring the display region (observation field of view) and magnification information when a specimen is observed again makes it possible to display a region of interest in a superimposed manner directly on the observation image that is observed via the eyepiece 106.

According to Modification 3 of the fourth embodiment described above, it is possible to present a region of interest in an observation image by simple operations.

Fifth Embodiment

A fifth embodiment will be described next. In the above-described first to fourth embodiments, a region of interest in a plane image, such as a two-dimensional specimen image, is set. In the fifth embodiment, a region of interest in a stereoscopic image, such as a CT image, a MRI image, or a three-dimensional specimen image, is set. The same components as those of the information processing system 1 according to the first embodiment are denoted with the same reference numbers and detailed description thereof will be omitted.

Configuration of Information Processing System

Figure 25:
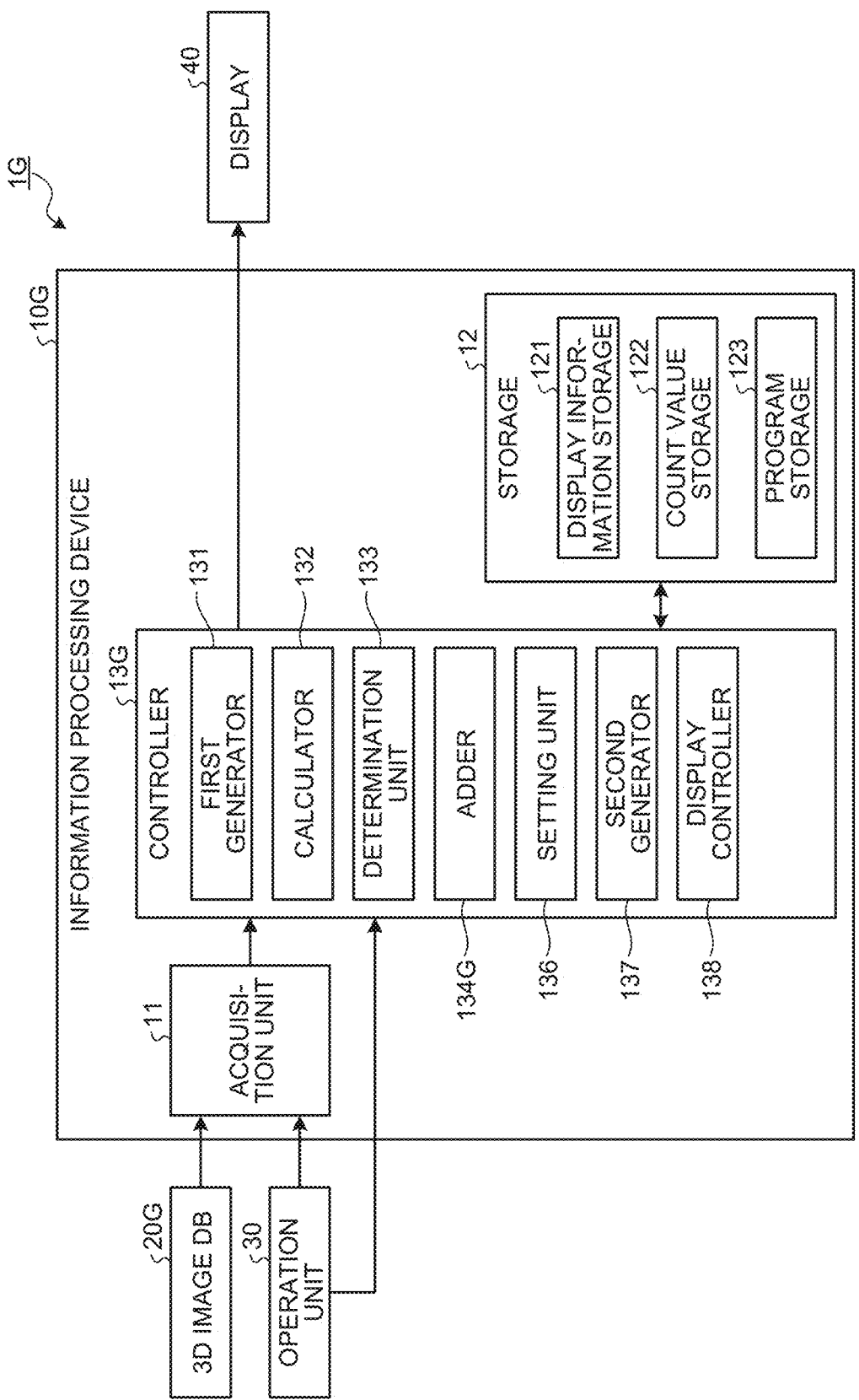
FIG. 25 is a block diagram illustrating a functional configuration of an information processing system according to a fifth embodiment.

FIG. 25 is a block diagram illustrating a functional configuration of an information processing system according to the fifth embodiment. An information processing system 1G illustrated in FIG. 25 includes an image DB 20G that stores multiple sets of stereoscopic image data, such as CT images, MRI images, or three-dimensional specimen images, and an information processing device 10G instead of the image DB 20 and the information processing device 10 of the information processing system 1 according to the first embodiment described above.

Configuration of Information Processing Device

The information processing device 10G includes a controller 13G instead of the controller 13 of the information processing device 10 according to the above-described first embodiment. The controller 13G includes an adder 134G instead of the adder 134 according to the above-described first embodiment.

The adder 134G makes an addition by incrementally increases the count value of frequency of display of a three-dimensional image. The adder 134G performs the same process as those of the first to fourth embodiments described above on the three-dimensional image.

Figure 26:
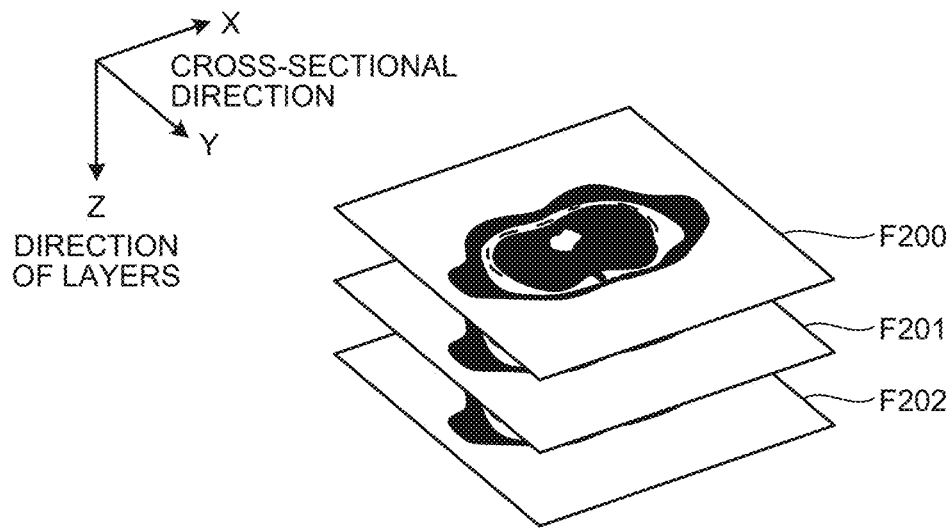
FIG. 26 is a diagram schematically illustrating an example of a CT image according to the fifth embodiment.
Figure 27:
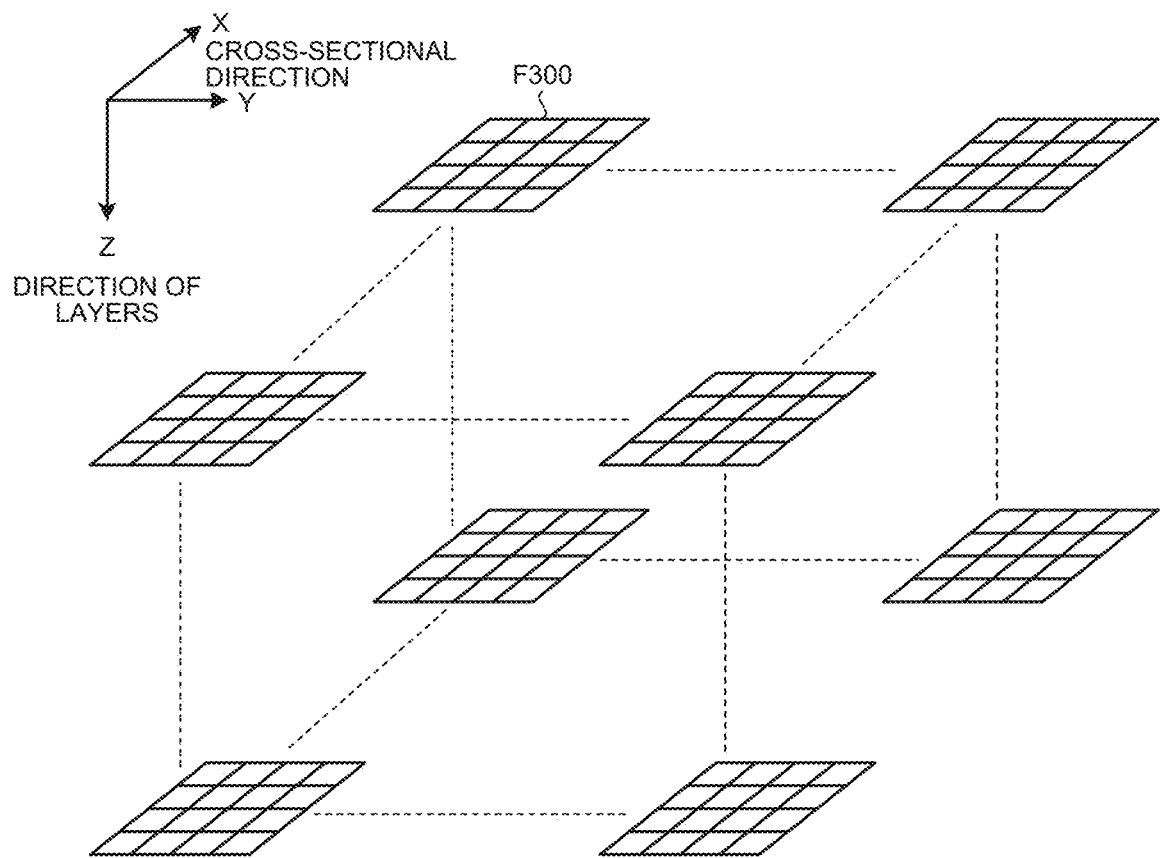
FIG. 27 is a diagram schematically illustrating an addition method of adding a count value of frequency of display of each cross-sectional image according to the fifth embodiment.
Figure 28:
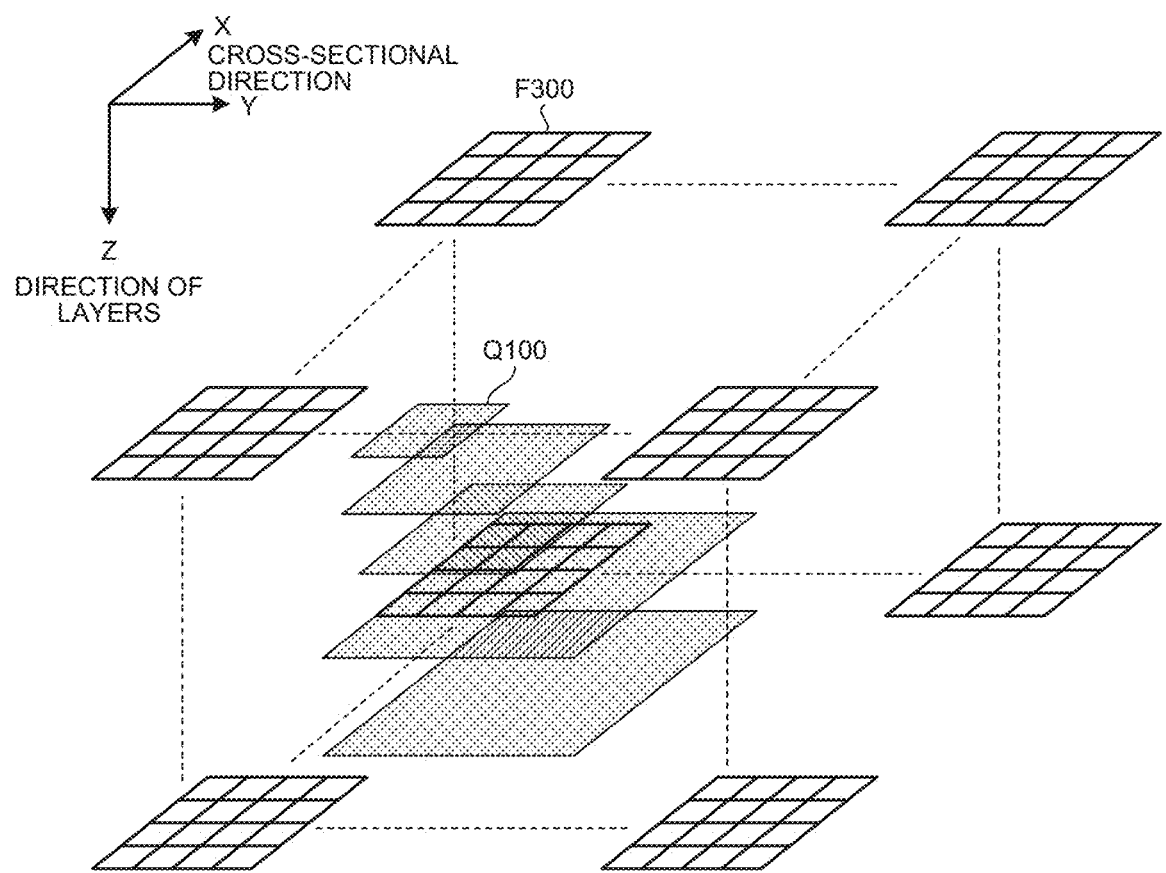
FIG. 28 is a diagram schematically illustrating that a region of interest is displayed in a superimposed manner stereoscopically on a CT image according to the fifth embodiment.

As illustrated in FIG. 26, in the information processing device 10G configured as described above, in the case a CT image in which multiple two-dimensional cross-sectional images are superimposed in a direction of layers, the adder 134G makes an addition to the count value of frequency of display with respect to each cross-sectional image F300 (see FIG. 27). In this case, as illustrated in FIG. 28, the display controller 138 displays a region of interest Q100 in a superimposed manner on the CT image stereoscopically.

According to the fifth embodiment described above, it is possible to present a region of interest in a specimen image by simple operations.

Other Embodiments

It is possible to form various embodiments by appropriately combining multiple components disclosed in the above-described first to fifth embodiments. For example, some components may be omitted from all the components described in the first to fifth embodiments described above. Components described in the first to fifth embodiments described above may be combined appropriately.

In the first to fifth embodiments of the disclosure, "unit", "-er" and "-or" described herein may be read as "means", "circuitry", or the like. For example, the controller may be read as a control means or a control circuitry.

The programs that the information processing devices according to the first to fifth embodiments are caused to execute region recorded as installable or executable file data in a computer-readable recording medium, such as a CD-ROM, a flexible disk (FD), a CD-R, a digital versatile disk (DVD), a USB medium, or a flash memory, and are provided.

The programs that the information processing devices according to the first to fifth embodiments are caused to execute may be stored in a computer that is connected to a network, such as the Internet, and may be configured to be downloaded via the network and thus be provided. Furthermore, the programs that the information processing devices according to the first to fifth embodiments are caused to execute may be provided or distributed via a network, such as the Internet.

In the first to fifth embodiments, signals are transmitted from various devices via transmission cables. For example, it need not be wired transmission and it may be wireless transmission. In this case, signals may be transmitted from each device according to predetermined wireless communication standards (for example, Wi-Fi (trademark) or Bluetooth (trademark)). Needless to say, wireless communication may be performed according to other wireless communication standards.

In the description of the flowcharts herein, the context of the process among steps is clearly specified using expressions including "first of all", "then", and "subsequently"; however, the order of the processes necessary to implement the disclosure is not uniquely determined by those expressions. In other words, the order of processes in the flowcharts described herein is changeable within a range without inconsistency.

According to the disclosure, an effect that it is possible to present a region of interest in an image by simple operations is achieved.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing device comprising:
    a storage configured to store display region information and a count value, the display region information indicating a position of a predetermined display region in a first image corresponding to image data that is input from an external device, the count value indicating frequency of display of each predetermined region in the first image; and
    a processor comprising hardware, the processor being configured to:
    based on the image data and an instruction signal that is input from an external device to select the display region, generate a display image corresponding to the display region that is selected by the instruction signal, using the first image,
    determine whether the display region information meets a first condition,
    add a predetermined value to the count value of the region on which it is determined that the first condition is met, set, for a region of interest, a region that draws an interest in the first image based on the count value; and
cause a display to display the display image,
wherein the first condition is a display time during which the display image is displayed on the display, and
the processor is further configured to:
determine whether a display of the display image has been made in a constant size within a predetermined moving range for a predetermined time, and
make an addition to the count value of the region on which it is determined that the display time is longer than a predetermined time.

2. An information processing device comprising:
a storage configured to store display region information and a count value, the display region information indicating a position of a predetermined display region in a first image corresponding to image data that is input from an external device, the count value indicating frequency of display of each predetermined region in the first image; and
a processor comprising hardware, the processor being configured to:
based on the image data and an instruction signal that is input from an external device to select the display region, generate a display image corresponding to the display region that is selected by the instruction signal, using the first image,
determine whether the display region information meets a first condition,
add a predetermined value to the count value of the region on which it is determined that the first condition is met,
set, for a region of interest, a region that draws an interest in the first image based on the count value;
cause a display to display the display image,
make a determination on a second condition that is different from the first condition;
determine whether the magnification rate of the displayed region at a subject time is larger than that of the displayed region before and after the subject time with respect to the each predetermined region, and
make an addition to the count value of the region on which it is determined that the magnification rate of the displayed region at the subject time is larger than that of the displayed region before and after the subject time.

3. An information processing device comprising:
a storage configured to store display region information and a count value, the display region information indicating a position of a predetermined display region in a first image corresponding to image data that is input from an external device, the count value indicating frequency of display of each predetermined region in the first image; and
a processor comprising hardware, the processor being configured to:
based on the image data and an instruction signal that is input from an external device to select the display region, generate a display image corresponding to the display region that is selected by the instruction signal, using the first image,
determine whether the display region information meets a first condition,
add a predetermined value to the count value of the region on which it is determined that the first condition is met,
set, for a region of interest, a region that draws an interest in the first image based on the count value;
cause a display to display the display image,
make a determination on a second condition that is different from the first condition; and
add, to the count value, the predetermined value that is weighted more as the magnification rate of the displayed region is larger.

4. An information processing device comprising:
a storage configured to store display region information and a count value, the display region information indicating a position of a predetermined display region in a first image corresponding to image data that is input from an external device, the count value indicating frequency of display of each predetermined region in the first image; and
a processor comprising hardware, the processor being configured to:
based on the image data and an instruction signal that is input from an external device to select the display region, generate a display image corresponding to the display region that is selected by the instruction signal, using the first image,
determine whether the display region information meets a first condition,
add a predetermined value to the count value of the region on which it is determined that the first condition is met,
set, for a region of interest, a region that draws an interest in the first image based on the count value;
cause a display to display the display image, and
make a determination on a second condition that is different from the first condition;
wherein the second condition is a deviation of a position in which the display image is displayed and a size of the display region of the display image or a deviation of a position in which the display image is displayed and a size of the display region of the display image in a predetermined time, and
the processor is further configured to make an addition to the count value of the region on which it is determined that the deviation is equal to or smaller than a predetermined value.

5. An information processing device comprising:
a storage configured to store display region information and a count value, the display region information indicating a position of a predetermined display region in a first image corresponding to image data that is input from an external device, the count value indicating frequency of display of each predetermined region in the first image; and
a processor comprising hardware, the processor being configured to:
based on the image data and an instruction signal that is input from an external device to select the display region, generate a display image corresponding to the display region that is selected by the instruction signal, using the first image,
determine whether the display region information meets a first condition,
add a predetermined value to the count value of the region on which it is determined that the first condition is met,
set, for a region of interest, a region that draws an interest in the first image based on the count value;
analyze features of the first image to perform segmentation according to each of the features, analyze region-of-interest features of the region of interest, and extract a region similar to the region of interest from the first image based on the region-of-interest features and the features of the first image.

6. The information processing device according to claim 5, the processor is further configured to generate a query for searching multiple sets of image data for similar image data based on the region-of-interest features, and search an image database storing multiple sets of image data for an image based on the query.

7. An information processing device comprising:

a storage configured to store display region information and a count value, the display region information indicating a position of a predetermined display region in a first image corresponding to image data that is input from an external device, the count value indicating frequency of display of each predetermined region in the first image; and a processor comprising hardware, the processor being configured to:

based on the image data and an instruction signal that is input from an external device to select the display region, generate a display image corresponding to the display region that is selected by the instruction signal, using the first image, determine whether the display region information meets a first condition, add a predetermined value to the count value of the region on which it is determined that the first condition is met, set, for a region of interest, a region that draws an interest in the first image based on the count value; and calculate the display region information indicating the position of the display region based on the instruction signal;

wherein the instruction signal includes:

position information indicating a position of a stage with respect to a reference position that is detected by a position detector that is arranged in a microscope and, and magnification information indicating an observation magnification at which a specimen is observed, the observation magnification being detected by a magnification detector that is arranged in the microscope.

* * * * *